US009990709B2

(12) United States Patent
Sawada et al.

(10) Patent No.: US 9,990,709 B2
(45) Date of Patent: Jun. 5, 2018

(54) IMAGE PROCESSING APPARATUS, METHOD, AND RECORDING MEDIUM FOR PROCESSING IMAGES USING DIFFERENT FILTERS

(71) Applicant: Panasonic Intellectual Property Management Co., Ltd., Osaka (JP)

(72) Inventors: Yoshihide Sawada, Kyoto (JP); Yasuhiko Adachi, Hyogo (JP); Taichi Sato, Kyoto (JP); Hideto Motomura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 93 days.

(21) Appl. No.: 14/816,103

(22) Filed: Aug. 3, 2015

(65) Prior Publication Data
US 2016/0063696 A1 Mar. 3, 2016

(30) Foreign Application Priority Data

Aug. 28, 2014 (JP) .................................. 2014-173707

(51) Int. Cl.
*G06K 9/00* (2006.01)
*G06T 7/00* (2017.01)
(Continued)

(52) U.S. Cl.
CPC .......... *G06T 7/0012* (2013.01); *G06T 3/4053* (2013.01); *H04N 5/2354* (2013.01); *H04N 5/23232* (2013.01); *G06T 2207/30004* (2013.01)

(58) Field of Classification Search
CPC .................... G06T 2207/30004; G06T 3/4053
See application file for complete search history.

(56) References Cited

U.S. PATENT DOCUMENTS

2003/0091221 A1* 5/2003 Marcelpoil ............ G01N 21/27
382/128
2003/0138140 A1* 7/2003 Marcelpoil ........ G01N 15/1475
382/162
(Continued)

FOREIGN PATENT DOCUMENTS

JP 2006-140885 6/2006
JP 2008-011491 1/2008
(Continued)

OTHER PUBLICATIONS

Minagawa Hiroyuki, "Imaging Apparatus and Method Thereof", Nov. 9, 2008, English Translation of JP Patent JP2008-211678, p. 1-15.*

(Continued)

*Primary Examiner* — Gandhi Thirugnanam
(74) *Attorney, Agent, or Firm* — Wenderoth, Lind & Ponack, L.L.P.

(57) ABSTRACT

An image processing apparatus includes a divider that generates a plurality pieces of third image information on the basis of a plurality of pieces of first image information and a plurality of pieces of second image information, a determiner that determines, on the basis of information regarding a sample, a filter to be used for the plurality of pieces of third image information, and a processor that deconvolutes each of the plurality of pieces of third image information using the determined filter. An image sensor that has received first resulting light emitted from a sample that has received first light emitted from a first angle outputs the plurality of pieces of first image information. The image sensor that has received second resulting light emitted from the sample that has received second light emitted from a second angle outputs the plurality of pieces of second image information.

8 Claims, 27 Drawing Sheets

(51) Int. Cl.
*G06T 3/40* (2006.01)
*H04N 5/232* (2006.01)
*H04N 5/235* (2006.01)

(56) References Cited

U.S. PATENT DOCUMENTS

| | | | | |
|---|---|---|---|---|
| 2005/0002551 | A1* | 1/2005 | Takagi | G06T 5/20 |
| | | | | 382/132 |
| 2007/0296829 | A1* | 12/2007 | Nakamura | H04N 5/2251 |
| | | | | 348/229.1 |
| 2008/0080019 | A1* | 4/2008 | Hayashi | H04N 5/3572 |
| | | | | 358/474 |
| 2008/0165261 | A1* | 7/2008 | Kamo | G02B 7/102 |
| | | | | 348/240.3 |
| 2010/0118133 | A1* | 5/2010 | Walter | G01N 1/06 |
| | | | | 348/79 |
| 2010/0128841 | A1* | 5/2010 | Imas | G06T 5/002 |
| | | | | 378/16 |
| 2013/0222689 | A1* | 8/2013 | Ligeti | G06T 5/00 |
| | | | | 348/441 |
| 2014/0118529 | A1* | 5/2014 | Zheng | G21K 7/00 |
| | | | | 348/80 |
| 2014/0126691 | A1 | 5/2014 | Zheng et al. | |
| 2014/0336508 | A1* | 11/2014 | Kang | G06T 5/20 |
| | | | | 600/437 |
| 2015/0054979 | A1* | 2/2015 | Ou | G02B 21/084 |
| | | | | 348/222.1 |
| 2016/0063696 | A1* | 3/2016 | Sawada | G06T 7/0012 |
| | | | | 382/128 |

FOREIGN PATENT DOCUMENTS

| | | |
|---|---|---|
| JP | 2008-085697 | 4/2008 |
| JP | 2008-172321 | 7/2008 |
| JP | 2008-211678 | 9/2008 |
| JP | 2012-023498 | 2/2012 |

OTHER PUBLICATIONS

Extended European Search Report dated Dec. 18, 2015 in corresponding European Patent Application No. 15179683.6.
Alon Greenbaum et al: "Increased Space-Bandwidth Product in Pixel Super-Resolved Lensfree On-Chip Microscopy", Scientific Reports, vol. 3, Apr. 24, 2013 (Apr. 24, 2013), pp. 1-8.
Guoan Zheng et al: "Sub-Pixel Resolving Optofluidic Microscope for On-Chip Cell Imaging", Lab on a Chip, vol. 10, No. 22, Jan. 31, 2010 (Jan. 31, 2010), p. 3125, 5 pages.

* cited by examiner

| 1700a | 1700b | 1700c | 1700d | 1700e |
|-------|-------|-------|-------|-------|
| 1700f | 1700g | 1700h | 1700i | 1700j |
| 1700k | 1700l | 1700m | 1700n | 1700o |
| 1700p | 1700q | 1700r | 1700s | 1700t |
| 1700u | 1700v | 1700w | 1700x | 1700y | w, h

FIG. 18
1801  1802  1803
0003_0025_0000
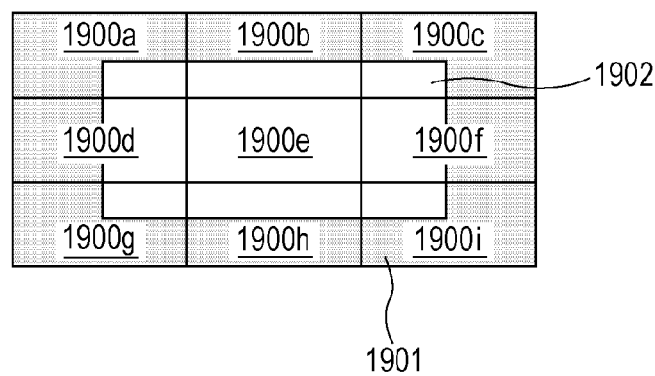
FIG. 19
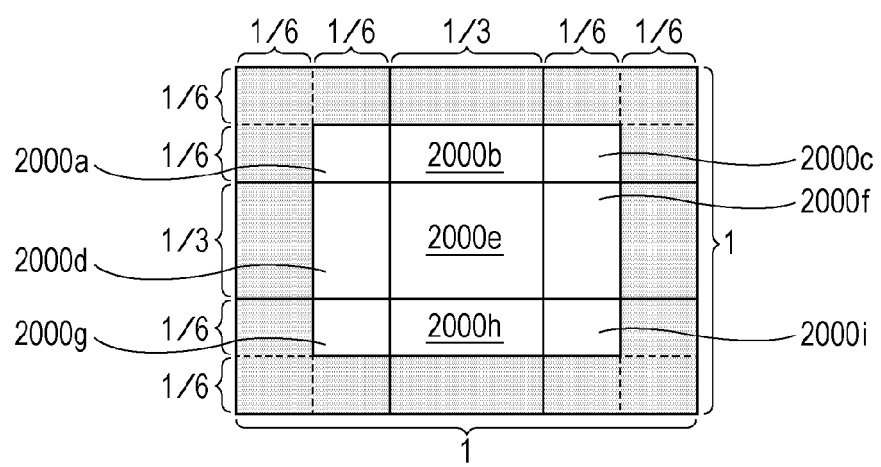
FIG. 20

FIG. 23

NUMBER: FILTER NAME: NUMBER OF TIMES

2203

1: FILTER D: 17

2: FILTER A: 15

3: FILTER E: 14

4: FILTER B: 10

5: FILTER C: 8

6: FILTER F: 7

7: FILTER G: 5

8: FILTER H: 1

2301

1.0

0.88

0.82

0.59

0.47

0.41

0.29

0.06

2302

1: FILTER D: 17

2: FILTER A: 15

3: FILTER E: 14

4: FILTER B: 10

5: FILTER I: 9

6: FILTER C: 8

7: FILTER F: 7

8: FILTER G: 5

IMAGE PROCESSING APPARATUS, METHOD, AND RECORDING MEDIUM FOR PROCESSING IMAGES USING DIFFERENT FILTERS

BACKGROUND

1. Technical Field

The present disclosure relates to an image processing apparatus, a method for processing an image, and a recording medium.

2. Description of the Related Art

When a high-resolution image is obtained, deconvolution is performed using a plurality of images. The deconvolution is a process for restoring an original signal (original image signal) from a measured signal (measured image signal). In order to perform appropriate deconvolution, a filter, such as a point spread function (PSF), that depends on how light enters an image sensor needs to be set.

In Japanese Unexamined Patent Application Publication No. 2006-140885, for example, it has been proposed that the PSF be obtained using quantum dots or fluorescent beads. In Japanese Unexamined Patent Application Publication No. 2008-85697, Japanese Unexamined Patent Application Publication No. 2008-11491, and Japanese Unexamined Patent Application Publication No. 2008-211678, it has been proposed that an appropriate filter be selected from a plurality of types of filters.

SUMMARY

It is difficult to accurately obtain the PSF. Moreover, because the PSF is proportional to an image capture magnification, a measurement error in the PSF increases in proportion to the image capture magnification, thereby deteriorating the quality of a resulting image.

One non-limiting and exemplary embodiment provides an image processing apparatus capable of obtaining a high-resolution image without measuring the PSF.

In one general aspect, the techniques disclosed here feature an image processing apparatus including a divider that generates a plurality pieces of third image information on the basis of a plurality of pieces of first image information and a plurality of pieces of second image information, each of the plurality of pieces of third image information including one of the plurality of pieces of first image information and one of the plurality of pieces of second image information, a determiner that determines, on the basis of information regarding a sample, a filter to be used for the plurality of pieces of third image information, and a processor that deconvolutes each of the plurality of pieces of third image information using the determined filter. The sample receives first light emitted from a first angle and emits first resulting light. An image sensor receives the first resulting light and outputs the plurality of pieces of first image information. The sample receives second light emitted from a second angle and emits second resulting light. The image sensor receives the second resulting light and outputs the plurality of pieces of second image information. The first light and the second light are emitted from the same light source or different light sources. There is no focusing optical system along an optical path extending from the same light source to the image sensor or optical paths extending from the different light sources to the image sensor.

According to the present disclosure, a high-resolution image can be provided in consideration of a type of pathological sample and differences between portions of the pathological sample.

It should be noted that general or specific embodiments may be implemented as a system, a method, an integrated circuit, a computer program, a computer-readable recording medium, or any selective combination thereof. The computer-readable recording medium may be, for example, a nonvolatile recording medium such as a compact disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 illustrates an example of a number given to a filter;

FIG. 19 schematically illustrates how a pixel value of a pixel at a position (i, j) is generated;

FIG. 20 illustrates a method for setting typical filter values at a time when a high-resolution image is obtained with a magnifying power of 3;

FIG. 23 illustrates evaluation values of a filter group;

DETAILED DESCRIPTION

Figure 1:
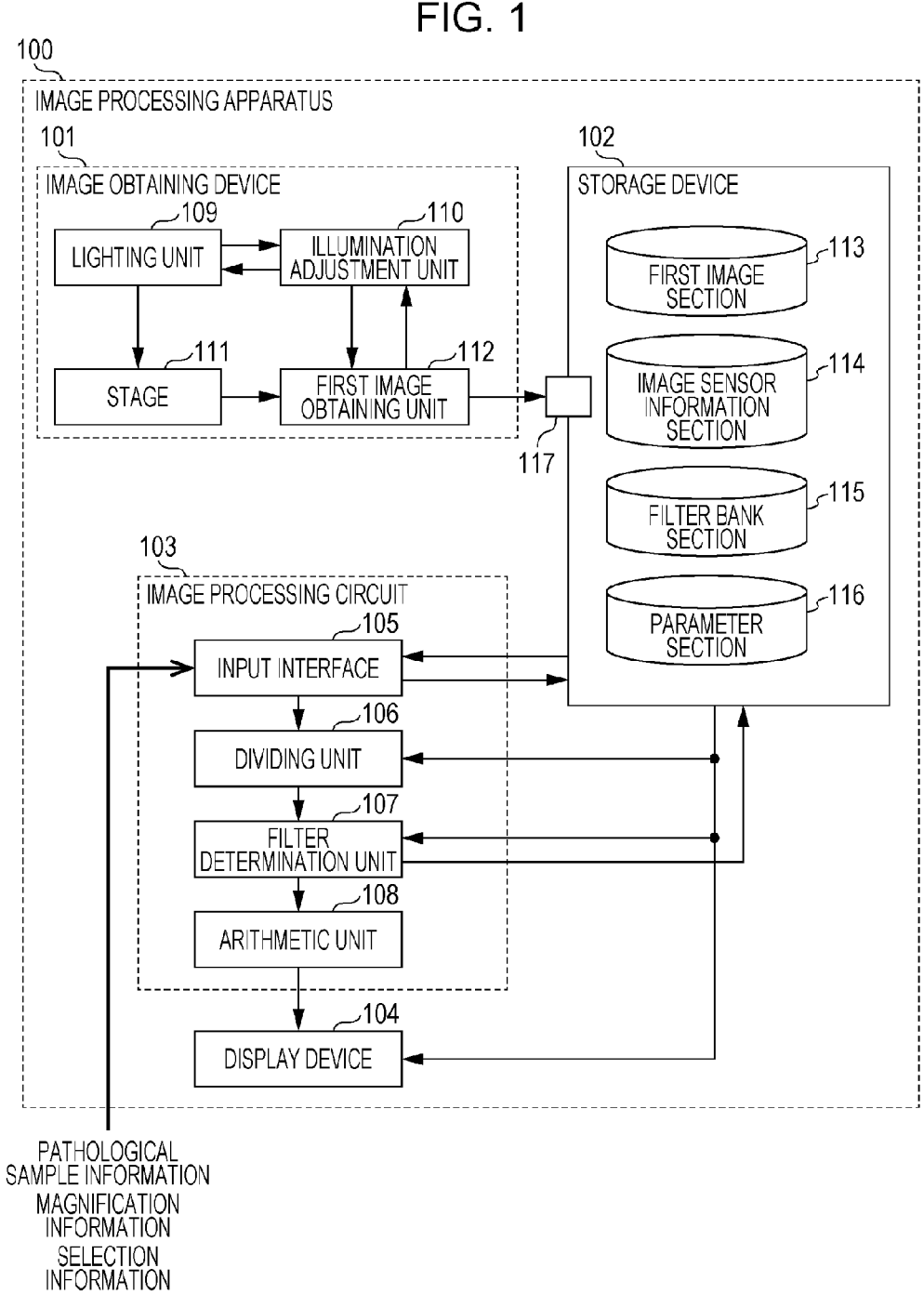
FIG. 1 is a block diagram illustrating the configuration of an image processing apparatus according to a first embodiment.

An image processing apparatus, a method for processing an image, and a computer program according to embodiments of the present disclosure will be described hereinafter with reference to the accompanying drawings.
Underlying Knowledge Forming Basis of the Present Disclosure An objective of diagnosis in medicine is to identify a disease and understand the condition of a patient. A treatment plan is designed in accordance with the disease or the condition. In order to confirm the disease or the condition, a pathological diagnosis is made in which a sample is obtained from a lesion and cells included in the sample are observed. In the pathological diagnosis, the sample is sliced into a section that is sufficiently thin to be observed under a microscope. The obtained section needs to be sufficiently thin (for example, about 4 μm) to let light passes therethrough. The section is then stained. An image of the section is captured using a digital camera or a scanner through the microscope and saved as a digital image. The saved digital image is used as a reference as necessary.

When a diagnostic image is digitized in the above-described manner, it is important to take into consideration the resolution of saved image data, which is used as a reference as necessary. Suppose, for example, that a pathologist desires to evaluate shapes of cells in an image. If the shapes of the cells cannot be identified with the resolution of the obtained image, it is difficult for the pathologist to make an appropriate diagnosis. An image displayed for a pathologist, therefore, needs to have high resolution.

In general, a process called "deconvolution" is performed in order to obtain a high-resolution image. The deconvolution is the following inverse transformation process.

$$X = D^{-1} * U \quad \text{[Math. 1]}$$

An asterisk in Math. 1 denotes a convolution operation, and a vector X denotes a high-resolution image whose size is x1×y1. A vector U is a magnified image. The magnified image is generated using a plurality of low-resolution images whose size is x2×y2 (x2<x1, y2<y1). The vector U is an image whose size is x1×y1. A vector D denotes a filter applied in the deconvolution.

As can be seen from Math. 1, the high-resolution image obtained through the deconvolution varies depending on how the filter D is designed. It is therefore important to appropriately design the filter D in order to output a desirable high-resolution image.

Suppose, for example, that the pathologist perform cytodiagnosis. In cytodiagnosis, magnification generally needs to be higher than in biopsy. If the magnification of an image used in cytodiagnosis is the same as that of an image used in biopsy, it might be difficult for the pathologist to make an appropriate diagnosis. On the other hand, an image having resolution as high as that of an image used in cytodiagnosis is satisfactory in biopsy. An increase in the resolution of an image, however, leads to an increase in image size, thereby increasing the amount of data stored in a storage medium. In addition, as the resolution increases, time taken to complete the deconvolution and display the image to a user increases. The resolution therefore needs to be adaptively determined in accordance with a type of diagnosis.

In the deconvolution, the resolution of an image mainly depends on the size of the filter D. Assume, for example, filters represented by Math. 2 and Math. 3. In actual deconvolution, normalization is performed to make a sum of values of each filter become 1.

$$D_1 = \begin{pmatrix} 1 & 2 & 1 \\ 2 & 4 & 2 \\ 1 & 2 & 1 \end{pmatrix} \quad \text{[Math. 2]}$$

$$D_2 = \begin{pmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{pmatrix} \quad \text{[Math. 3]}$$

These are Gaussian filters whose sizes are different from each other. An image of higher resolution can be output when deconvolution is performed using a filter $D_2$. That is, if the size of a filter can be changed in accordance with an image capture target, appropriate deconvolution can be performed.

A filter having the same size as the filter represented by Math. 2 but including different values is represented by Math. 4.

$$D_3 = \begin{pmatrix} 1 & 1 & 1 \\ 1 & 1 & 1 \\ 1 & 1 & 1 \end{pmatrix} \quad \text{[Math. 4]}$$

A result of the deconvolution can vary depending on not only the size of a filter used but also values of the filter. Results obtained using the filters represented by Math. 2 and Math. 4 are therefore different from each other.

It is known that values of a filter can be affected by a PSF and an aperture ratio of an image sensor. In practice, however, differences in a pathological sample also affect the values of a filter. Whether or not a pathological sample is stained, a method for staining the pathological sample, the thickness and moisture content of the pathological sample, and the amount of mounting medium used for fixing the pathological sample to a slide, for example, differ between pathological samples even if the pathological samples are used for the same type of diagnosis. Due to such differences, appropriate deconvolution can be performed with some images while it is difficult to perform appropriate deconvolution with other images even if these images are used for the same type of diagnosis. If the values of a filter can be corrected, appropriate deconvolution can be performed even with such differences.

Whether or not a pathological sample is stained, a method for staining the pathological sample, the thickness and moisture content of the pathological sample, how well the pathological sample is stained, and the amount and type of mounting medium differ between portions of each pathological sample. An appropriate filter therefore needs to be set for each portion of each pathological sample in order to display an appropriate high-resolution image to the pathologist (user).

Now, differences between the image processing apparatus in the present disclosure and disclosures in Japanese Unexamined Patent Application Publication No. 2012-023498 and Japanese Unexamined Patent Application Publication No. 2008-172321 will be described. The image processing apparatus in the present disclosure is configured using CIS and does not include an optical system along an optical path extending from a lighting unit 109 to a stage 111. On the other hand, the disclosures in Japanese Unexamined Patent Application Publication No. 2012-023498 and Japanese Unexamined Patent Application Publication No. 2008-172321 both include an optical system along an optical path leading to an image sensor. The disclosures in Japanese Unexamined Patent Application Publication No. 2012-023498 and Japanese Unexamined Patent Application Publication No. 2008-172321 set a filter on the basis of the optical system. In Japanese Unexamined Patent Application Publication No. 2012-023498 and Japanese Unexamined Patent Application Publication No. 2008-172321, therefore, an appropriate filter is not selected in accordance with whether or not a pathological sample is stained, a method for staining the pathological sample, the thickness and moisture content of the pathological sample, how well the pathological sample is stained, and the amount and type of mounting medium. It is therefore difficult to provide a result of image information processing that takes into consideration the type of pathological sample and differences between portions of the pathological sample, that is, a high-resolution image.

As a result of the above-described examination, the following aspects of the present disclosure have been conceived.

An image processing apparatus according to an aspect of the present disclosure is an image processing apparatus including a divider that generates a plurality pieces of third image information on the basis of a plurality of pieces of first image information and a plurality of pieces of second image information, each of the plurality of pieces of third image information including one of the plurality of pieces of first image information and one of the plurality of pieces of second image information, a determiner that determines, on the basis of information regarding a sample, a filter to be used for the plurality of pieces of third image information, and a processor that deconvolutes each of the plurality of pieces of third image information using the determined filter. The sample receives first light emitted from a first angle and emits first resulting light. An image sensor receives the first resulting light and outputs the plurality of pieces of first image information. The sample receives second light emitted from a second angle and emits second resulting light. The image sensor receives the second resulting light and outputs the plurality of pieces of second image information. The first light and the second light are emitted from the same light source or different light sources. There is no focusing optical system along an optical path extending from the same light source to the image sensor or optical paths extending from the different light sources to the image sensor.

The information regarding the sample may include a type of sample. The type of sample may be a biopsy sample, a cytodiagnosis sample, or an unstained sample.

The image processing apparatus may further include a counter circuit that counts the number of times that the filter has been used. Priority of the filter may be determined on the basis of the number of times.

A first image may include the plurality of pieces of first image information and a second image may include the plurality of pieces of second image information. The type of sample may be determined on the basis of an image feature value of the first image.

An identification parameter indicating a feature value included in an image of a sample may be held for each type of sample. The type of sample may be identified using the feature value of the plurality of pieces of first image information and the identification parameters.

The processor may deconvolute each of the plurality of pieces of third image information using each of a plurality of types of filters and output a result of the deconvolution performed using each of the plurality of types of filters.

The image processing apparatus may further include a display device that displays a result obtained using each of the plurality of types of filters, and an input device that receives one of the results obtained using the plurality of types of filters.

The image processing apparatus may further include a storage device that holds a target image, and an image processing circuit that corrects image data regarding a resulting image using image data regarding the target image.

An image processing apparatus according to an aspect of the present disclosure is an image processing apparatus including an interface that obtains data regarding a plurality of images of a given pathological sample captured from different angles of radiation of light using an image obtaining device that does not include a focusing optical system along an optical path extending from a light source to an image sensor, a storage device used for storing filter information regarding a plurality of filters used for deconvolution, and an image processing circuit that performs the deconvolution using one of the plurality of filters included in the filter information determined on the basis of information regarding the pathological sample input from a user in a subregion of a magnified image including more pixels than each of the plurality of images, the magnified image being constructed on the basis of the plurality of images, and that outputs a result.

According to these configurations, a result of image information processing that takes into consideration the type of pathological sample and differences between portions of the pathological sample, that is, a high-resolution image, can be provided without measuring the PSF.

The pathological sample may include categories of a biopsy sample, a cytodiagnosis sample, and an unstained sample. According to this configuration, an appropriate high-resolution image can be displayed for each pathological sample used by the pathologist.

The image processing apparatus may further include a voter used for casting a vote indicating the type of filter determined by the determiner, and a feedback mechanism that changes numbers and the filter information saved in the storage device on the basis of a result of the voting. According to this configuration, the filter information stored in the storage device can be optimized.

The image processing apparatus may further include a feature calculator that calculates a feature value from the image selected by the input device, and an identifier that identifies the type of sample using the feature value calculated by the feature calculator. According to this configuration, the type of pathological sample can be automatically selected, and a high-resolution image can be output even if the user does not input the type of pathological sample or magnification.

The image processing apparatus may further include a display device that displays results of deconvolution using filters other than an optimal filter in order to enable the user to select an image. According to this configuration, the user can select an appropriate image even if the determined filter is not appropriate.

The display device may have a function of setting a target image in advance and, in order to achieve colors similar to those of the target image, reading a parameter from a parameter section and correcting a result of image information processing. According to this configuration, a high-resolution image of colors similar to those of the target image can be displayed even if an original image has been obtained in a different image capture environment.

The display device may have a function of storing the filter information determined by the determiner and the result of the image information processing output from the processor while associating the filter information and the result with each other. The input device may have a function of determining the filter information associated with the result of the image information processing as an input. The determiner may have a function of performing a process using filter information different from the filter information received by the input device. According to this configuration, the user can correct a displayed high-resolution image.

Exemplary embodiments of the present disclosure will be described in detail hereinafter with reference to the drawings.

First Embodiment

In a first embodiment, an image processing apparatus will be described that radiates light onto a pathological sample from right above and obliquely above, that captures images of the pathological sample from various angles while the pathological sample is being irradiated with the light, that selects an image capture target, that divides an image into subregions, that sequentially determines filters for the subregions while giving priority to subregions including the image capture target, and that deconvolutes the subregions using the determined filters.

FIG. 1 is a block diagram illustrating the configuration of the image processing apparatus according to the first embodiment.

An image processing apparatus 100 includes an image obtaining device 101, a storage device 102, an image processing circuit 103, and a display device 104. The image processing circuit 103 includes an input interface 105, a dividing unit 106, a filter determination unit 107, and an arithmetic unit 108. The image processing circuit 103 determines an appropriate filter for each portion of an image capture target without obtaining a PSF, and provides a high-resolution image.

Image Obtaining Device 101

The image obtaining device 101 includes a lighting unit 109, an illumination adjustment unit 110, a stage 111, and a first image obtaining unit 112.

The stage 111 is a base on which a pathological sample is disposed and fixed.

The lighting unit 109 includes a light source and radiates light onto the pathological sample from a plurality of positions of the light source. In one case, the lighting unit 109 may include only one light source and radiate light onto the pathological sample while changing a position of the light source each time the first image obtaining unit 112 captures an image. In another case, the lighting unit 109 may include a plurality of light sources whose positions are different from one another and radiate light onto the pathological sample from one of the plurality of light sources each time the first image obtaining unit 112 captures an image.

The illumination adjustment unit 110 adjusts the illumination of the lighting unit 109.

The first image obtaining unit 112 captures an image of the pathological sample disposed on the stage 111 and obtains an image signal indicating the image.

In the image obtaining device 101, the lighting unit 109 radiates light onto the pathological sample from right above and obliquely above while the illumination adjustment unit 110 is adjusting the illumination of the light source. The first image obtaining unit 112 captures an image of the pathological sample disposed on the stage 111 each time the light source radiates light onto the pathological sample. The first image obtaining unit 112 then converts electrical signals according to intensities of incident light obtained by an image sensor into digital signals and generates a digital image.

The first image obtaining unit 112 transmits obtained image data to the storage device 102. The storage device 102 obtains data regarding a plurality of images of the pathological sample through an interface 117. The interface 117 is, for example, a wired and/or wireless communication circuit or connection terminal. Any type of interface may be used insofar as the interface can receive image data from the image obtaining device 101. The storage device 102 is used for storing the data regarding the plurality of images of the pathological sample received through the interface 117 in a first image section 113.

The storage device 102 includes an image sensor information section 114, a filter bank section 115, and a parameter section 116, as well as the first image section 113. These sections are sets of information stored in the storage device 102.

The image sensor information section 114 holds information regarding an image sensor used, that is, for example, information regarding an aperture ratio of the image sensor.

The filter bank section 115 holds filter information used for deconvolution. In the filter bank section 115, (1) pathological sample information or magnification and (2) a plurality of filters of different sizes and/or values for different pieces of information regarding an image sensor are stored. The pathological sample information may be information identifying a type of pathological sample, namely, for example, a biopsy sample, a cytodiagnosis sample, or an unstained sample.

The parameter section 116 holds information regarding the size of subregions (for example, w pixel values in a horizontal direction and h pixel values in a vertical direction) and information regarding an average and a variance of pixel data regarding a target image, which will be described later. The parameter section 116 may hold information regarding the size of subregions and boundaries between the subregions in accordance with the pathological sample information (information identifying the type of pathological sample, namely, for example, a biopsy sample, a cytodiagnosis sample, or an unstained sample).

The image obtaining device 101 is typically an image capture device including an image sensor corresponding to the first image obtaining unit 112. The image capture device includes a lighting device corresponding to the lighting unit 109, a computer corresponding to the illumination adjustment unit 110, and a stage corresponding to the stage 111.

Although the image processing apparatus 100 herein includes the image obtaining device 101 and the display device 104, this is just an example. The image processing apparatus 100 need not necessarily include the image obtaining device 101 or the display device 104.

It is assumed, for example, that the image processing apparatus 100 does not include the image obtaining device 101. It is sufficient that the storage device 102 can only receive image data output from the image obtaining device 101 directly or indirectly. In a latter case, image data obtained by the image obtaining device 101 may be accumulated in a storage device that is not illustrated, and the image processing apparatus 100 may receive the image data from the storage device. In this case, the interface 117 of the image processing apparatus 100 is realized as a wired and/or wireless communication interface, a memory card interface, or the like.

It is assumed that the image processing apparatus 100 does not include the display device 104. The arithmetic unit 108 outputs image data regarding a generated high-resolution image to another storage device or a communication network through a wired and/or wireless communication interface, a memory card interface, or the like.

In the present embodiment, the stage 111 adopts a CIS method. In this method, a pathological sample is directly disposed on a surface of an image sensor and an image of the pathological sample is captured. In this method, an image is not magnified using a lens, and the size of pixels of the image sensor determines magnifying power, that is, image resolving power. In other words, as the size of pixels decreases, resolving power improves, and clearer images of microscopic structures can be captured.

Figure 2:
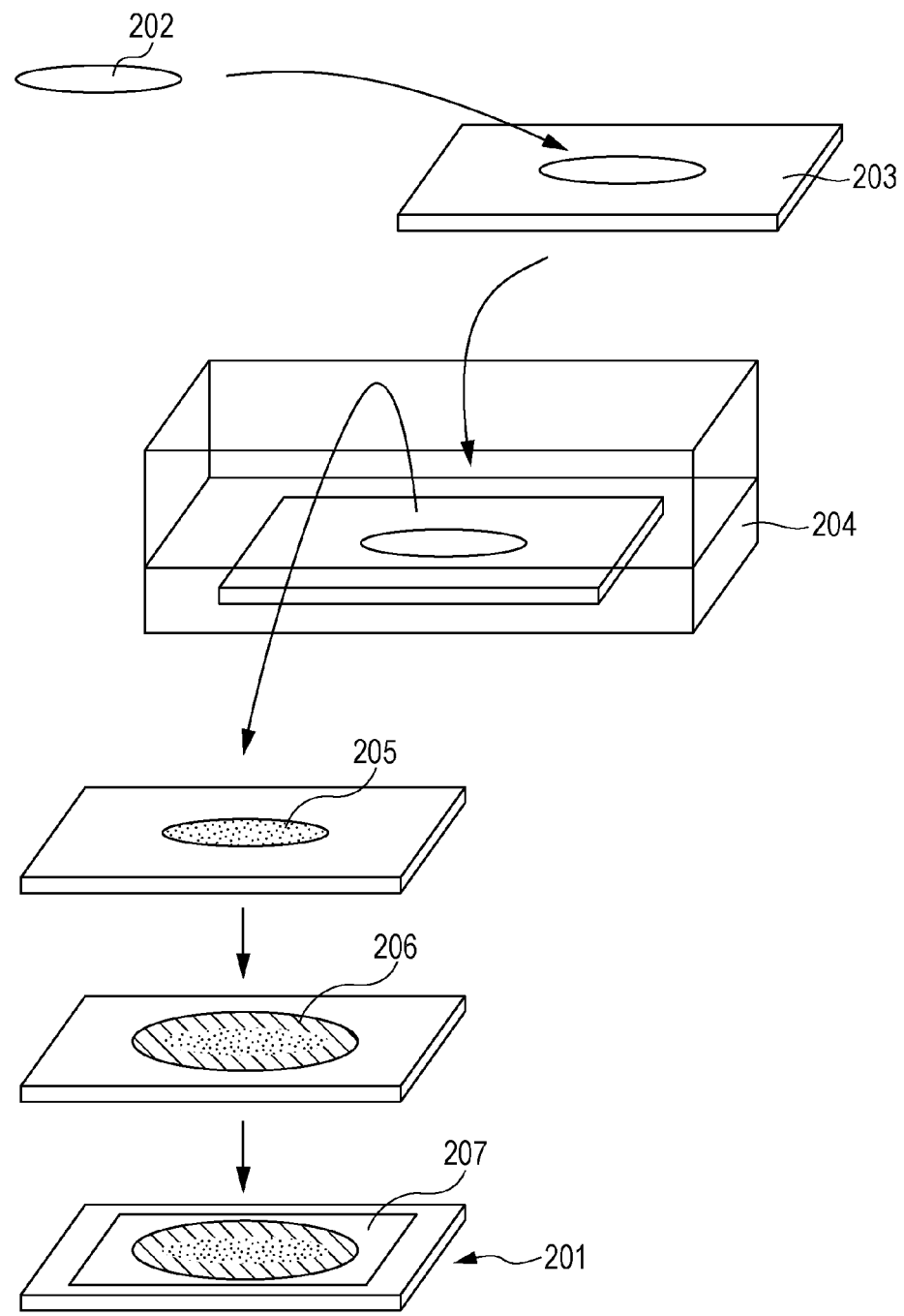
FIG. 2 is a diagram illustrating a method for creating a prepared slide in an example of the related art.
Figure 3:
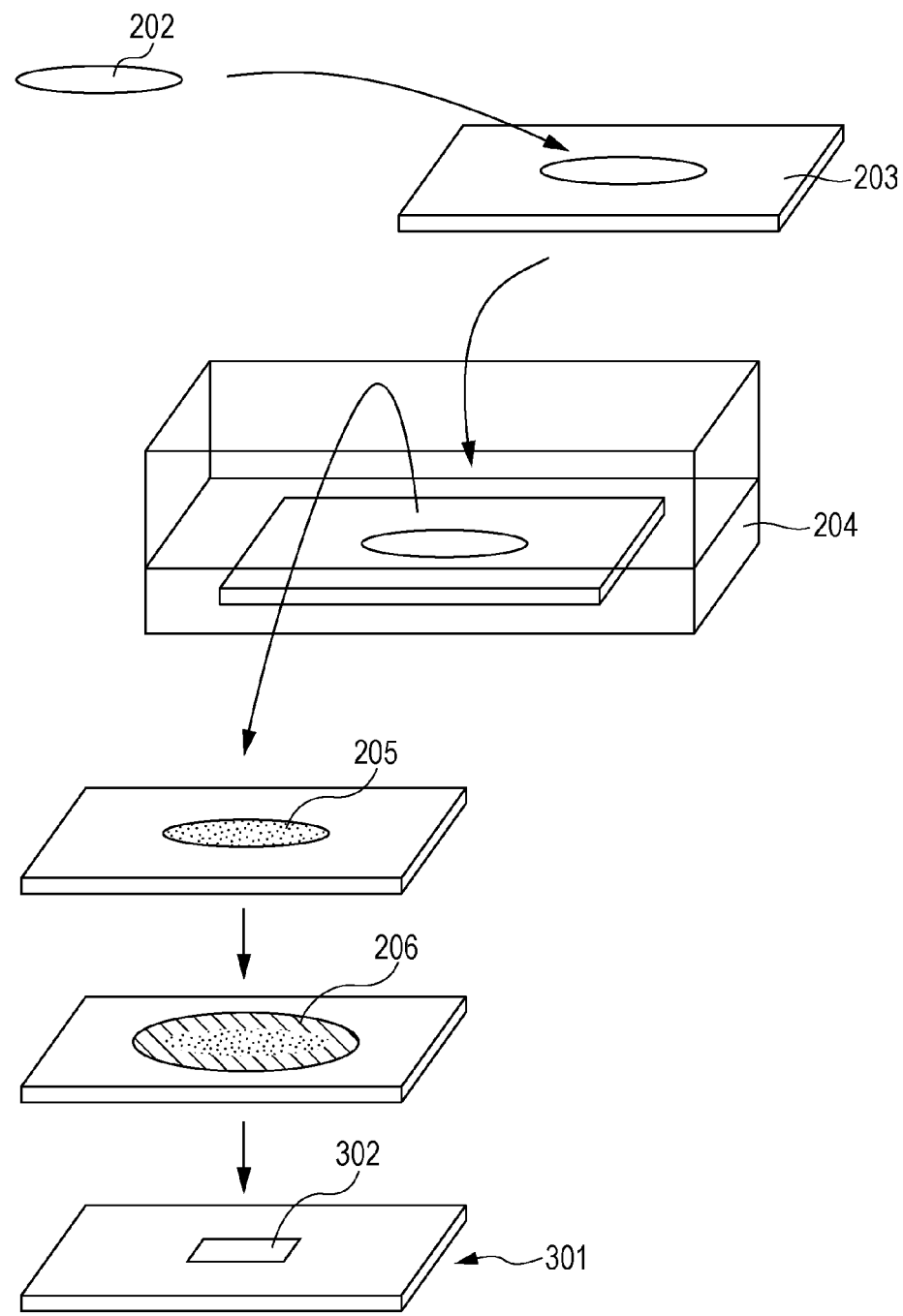
FIG. 3 is a diagram illustrating a method for creating a prepared slide using a contact image sensing (CIS) method.

FIGS. 2 and 3 illustrate a method used in an example of the related art and the CIS method, respectively. FIG. 2 illustrates a method for creating a prepared slide 201 adopted in an example of the related art, and FIG. 3 illustrates the CIS method.

In the method adopted in an example of the related art illustrated in FIG. 2, a thin pathological section 202 is mounted on a microscope slide 203. The pathological section 202 is soaked in a stain solution 204 along with the slide glass 203. The stain solution 204 permeates the pathological section 202, and a stained section 205 is obtained. A mounting medium 206 is applied in order to protect and fix the stained section 205. A cover glass 207 is then mounted, thus obtaining the prepared slide 201.

On the other hand, in the case of a CIS prepared slide 301 illustrated in FIG. 3, an image sensor 302 is mounted instead of the cover glass 207.

Figure 4:
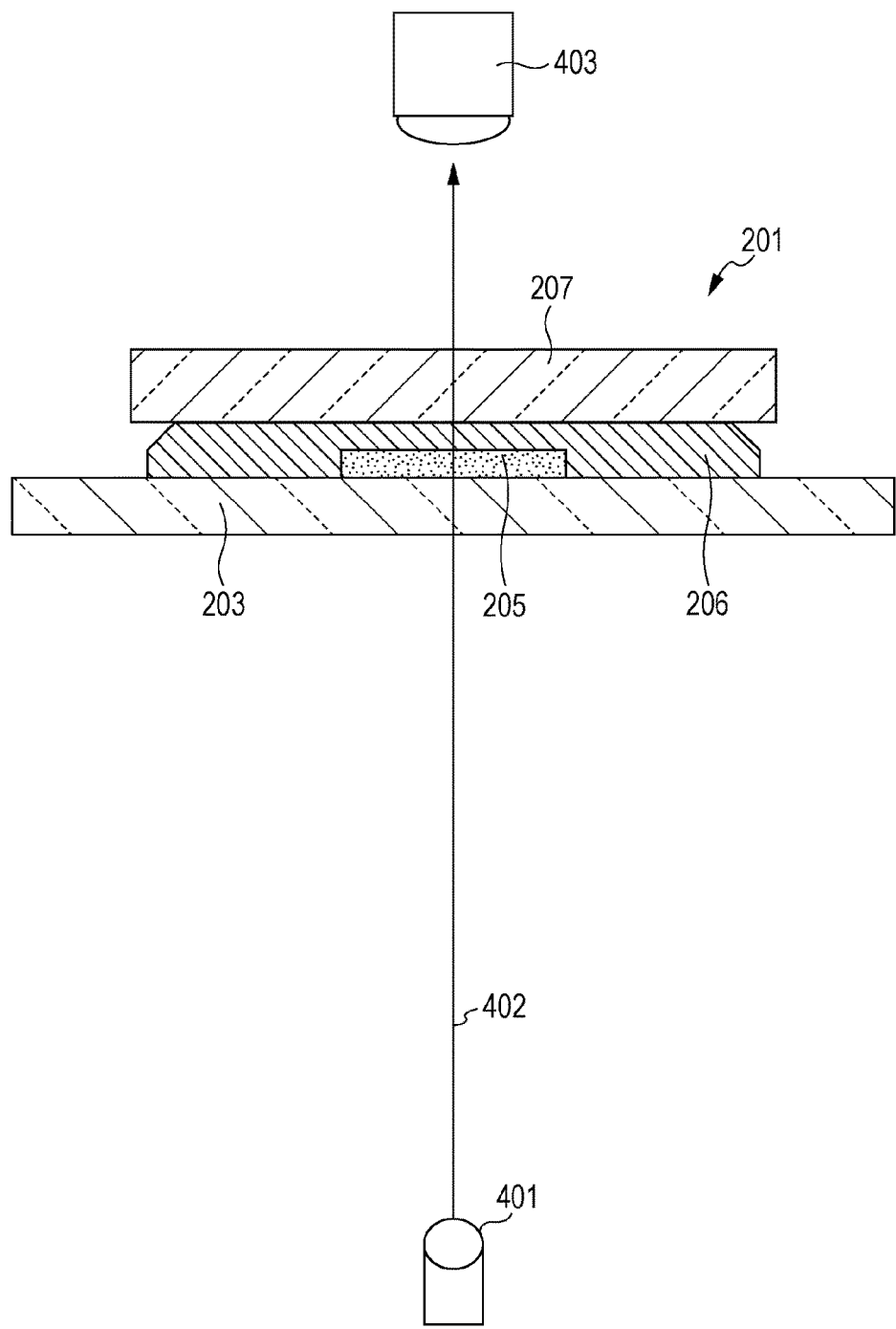
FIG. 4 is a cross-sectional view of the configuration of the prepared slide created in the example of the related art.

FIG. 4 is a cross-sectional view of the configuration of the prepared slide 201. The stained section 205 is disposed on the microscope slide 203, and the cover glass 207 covers the stained section 205. The mounting medium 206 fixes these elements. If the prepared slide 201 is set on an optical microscope and observed, a light source 401 is provided below the prepared slide 201. The light source 401 emits light 402. The light 402 passes through the microscope slide 203, the stained section 205, the mounting medium 206, and the cover glass 207 and enters an objective 403 of a microscope.

Figure 5:
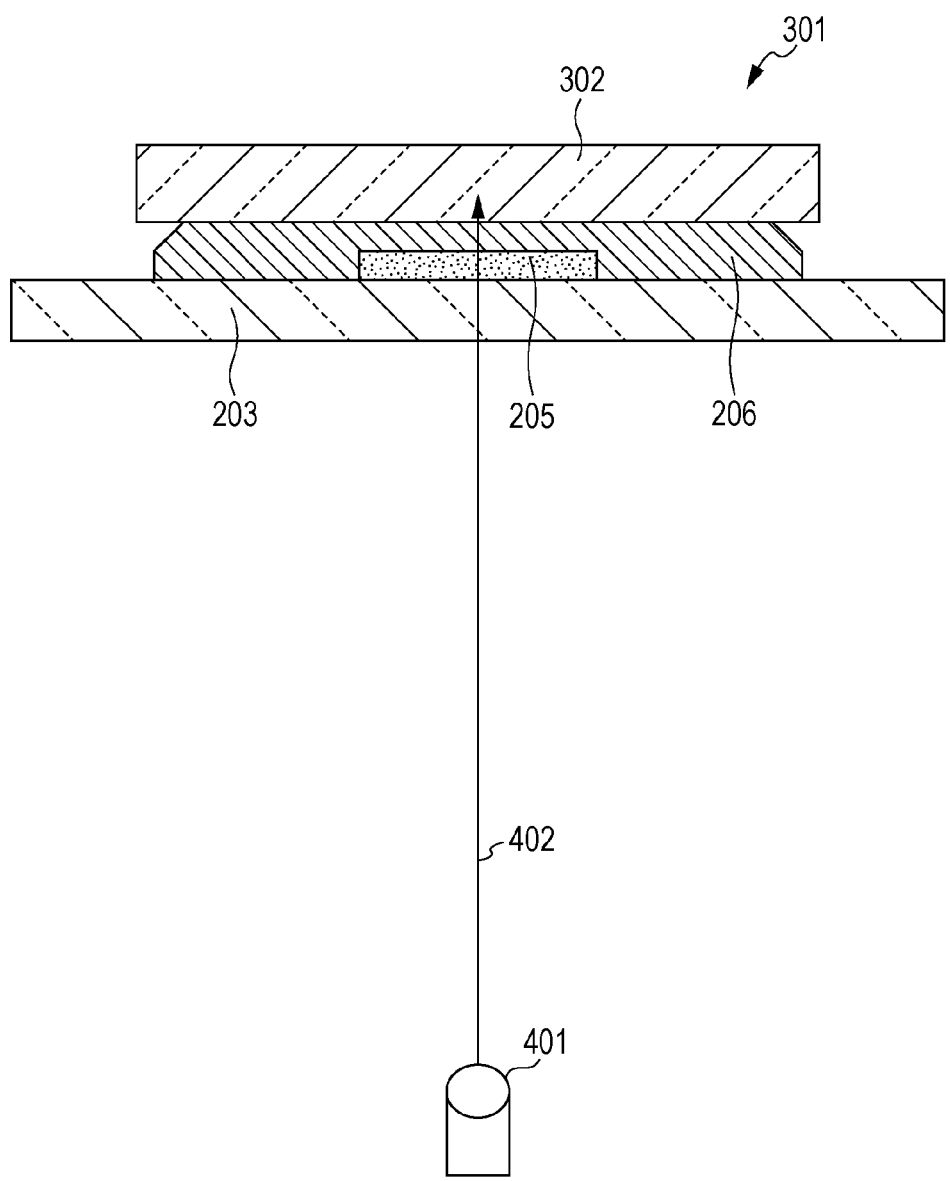
FIG. 5 is a cross-sectional view of the configuration of the prepared slide created using the CIS method.

On the other hand, FIG. 5 is a cross-sectional view of the configuration of the CIS prepared slide 301. The CIS prepared slide 301 includes the image sensor 302 instead of the cover glass 207. As illustrated in FIG. 5, the light 402 passes through the microscope slide 203, the stained section 205, and the mounting medium 206 and reaches the image sensor 302. The image sensor 302 outputs signals according to densities of the stained section 205, thus capturing an image of the stained section 205.

Figure 6:
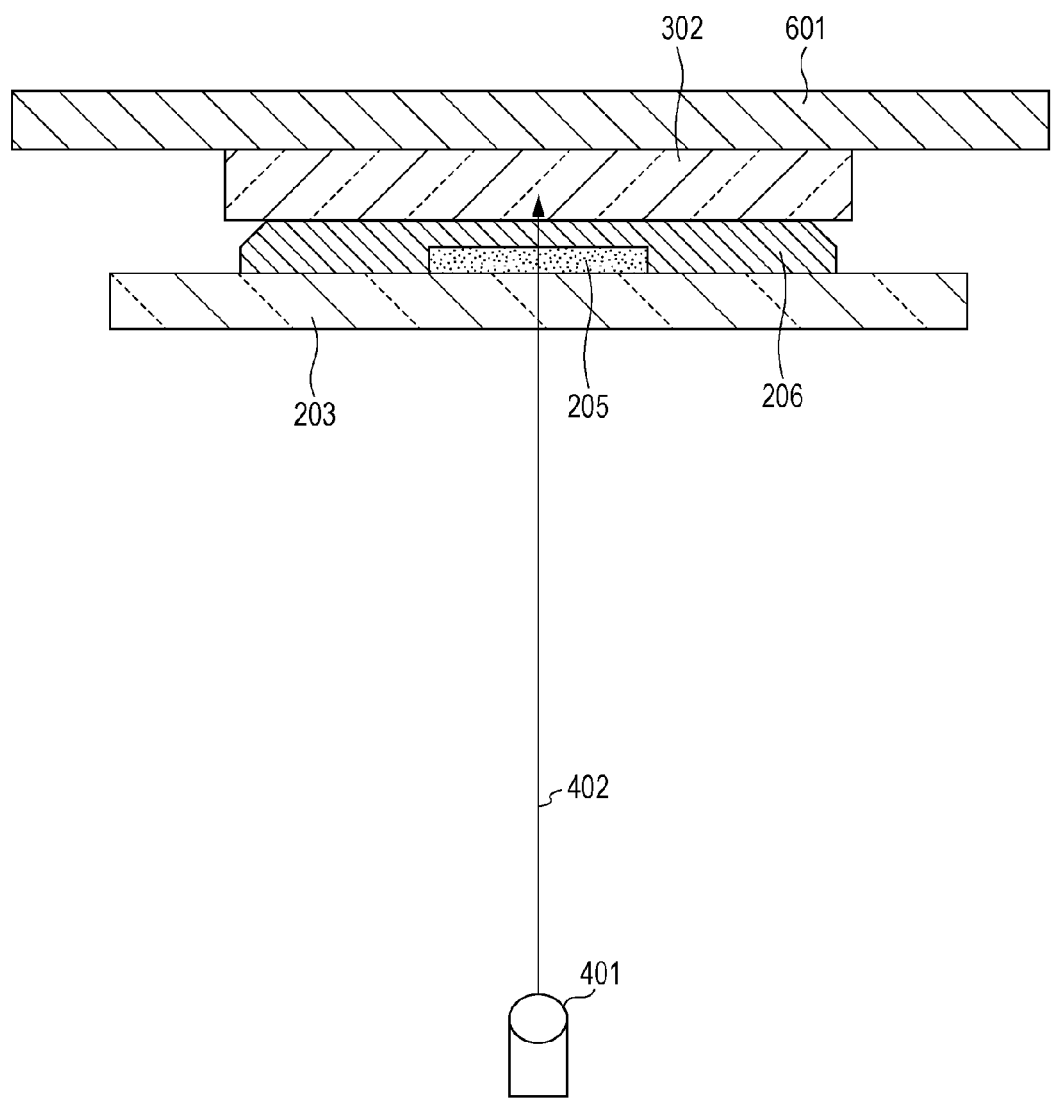
FIG. 6 is a cross-sectional view at a time when a package is connected to an image sensor in order to electrically receive an image captured by the image sensor.

FIG. 6 is a cross-sectional view at a time when a package 601 is connected to the image sensor 302 in order to electrically receive an image captured by the image sensor 302. The image sensor 302 and the package 601 are directly connected to each other. The image sensor 302 and the package 601 are electrically connected to each other using a through-silicon via (TSV).

Figure 7:
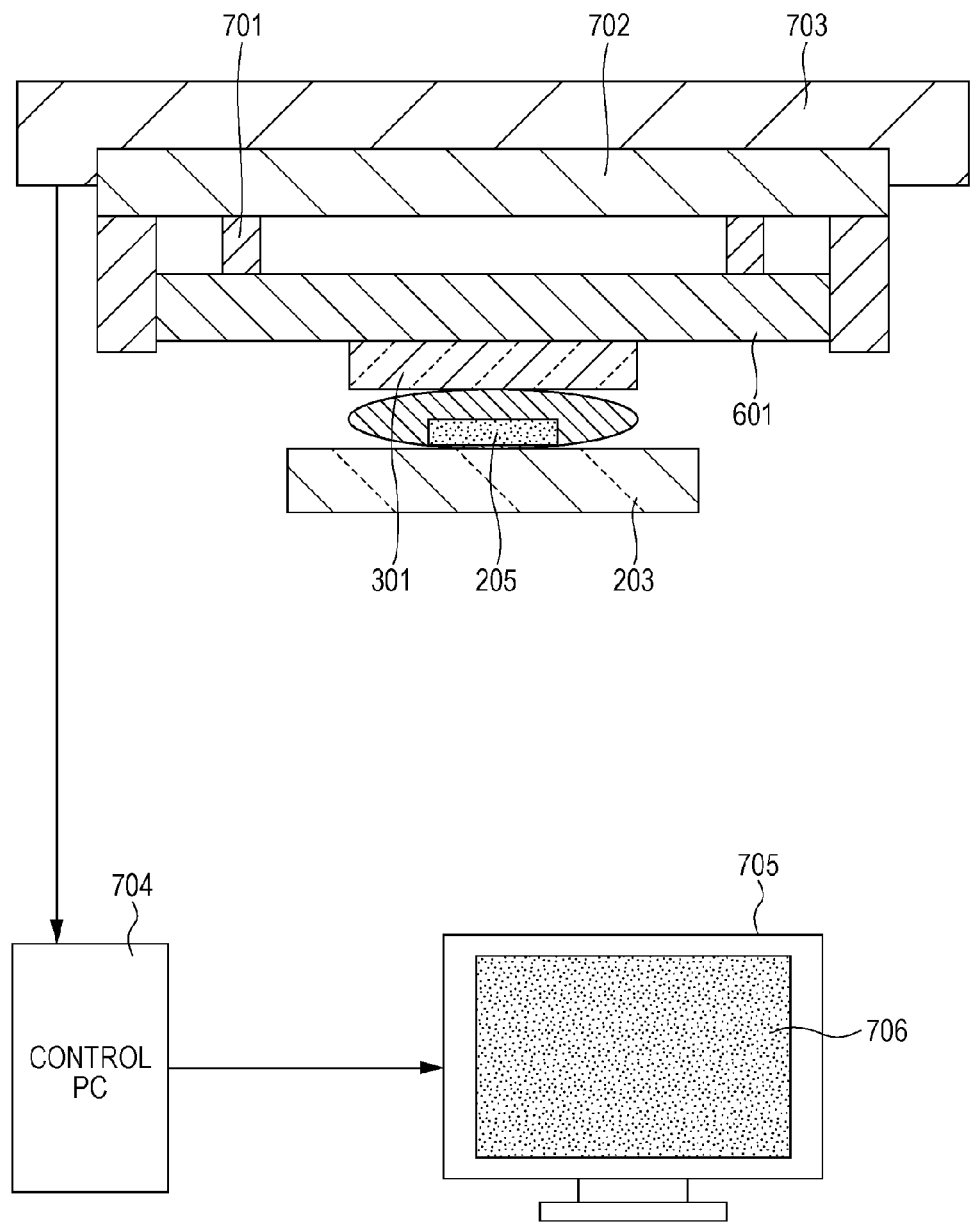
FIG. 7 illustrates an example of a configuration in which an image capture target is displayed as a digital image using the prepared slide created in the CIS method.

FIG. 7 illustrates an example of a configuration in which an image capture target is displayed as a digital image using the CIS prepared slide 301. As illustrated in FIG. 7, the package 601 is connected to a socket 702 through electrodes 701, and the socket 702 is connected to a circuit board 703. The circuit board 703 is connected to a control personal computer (PC) 704. A display 705 displays a stained section image 706, which is a captured image of the stained section 205.

Next, a method for obtaining a high-resolution image using the lighting unit 109 whose lighting angle can be changed and the stage 111 adopting the CIS method will be described. First, a relationship between an optical microscope and pixel pitch will be described.

In general, the resolving power of an optical microscope is defined as two-point resolution. Resolution δ between two radiating points is defined as follows on the basis of a Rayleigh criterion.

$$\delta = \frac{0.61 \times \lambda}{NA}$$ [Math. 5]

λ denotes the wavelength of light, and NA denotes the numerical aperture of the objective. If, for example, the magnification of the objective is 10, the NA is 0.25, and the wavelength is 555 nm in Math. 5, the resolution δ is 1.35 µm. If, therefore, the pixel pitch of the image sensor 302 is 1.35 µm, magnifying power is equivalent to a magnification of the objective of 10.

If the user desires to obtain a biological sample image with a magnifying power of the objective of 20, the user can achieve the magnifying power by halving the pixel pitch. It might be difficult, however, to refine the pixel configuration of an image sensor due to increased costs.

On the other hand, the magnifying power can be improved by radiating light onto a partially open image sensor at a plurality of radiation angles, capturing images of a plurality of areas smaller than the pixel size, and combining the images. Because, unlike a microscope, a lens is not used in this method, the PSF based on blurring caused in an optical system need not be obtained. Deconvolution can therefore be performed more accurately than in an example of the related art in which a microscope adopting an optical system is used.

In the following description, a method for obtaining first images by which, by changing the radiation angle of the lighting unit 109, to obtain an image with a magnifying power of 3 will be described while assuming that, as a specific example, the aperture ratio of the image sensor 302 is 25%. The term "a magnifying power of 3" means that the length and width of a certain image become three times as large as those of the first image whereas resolution becomes one third of the original resolution. In the following description, the first images will be referred to as "low-resolution images", and an image (the above-mentioned "certain image") obtained as a result of image information processing will be referred to as a "high-resolution image".

First, for convenience of description, a method for obtaining low-resolution images by which to obtain an image with a magnifying power of 2 will be described.

Figure 8:
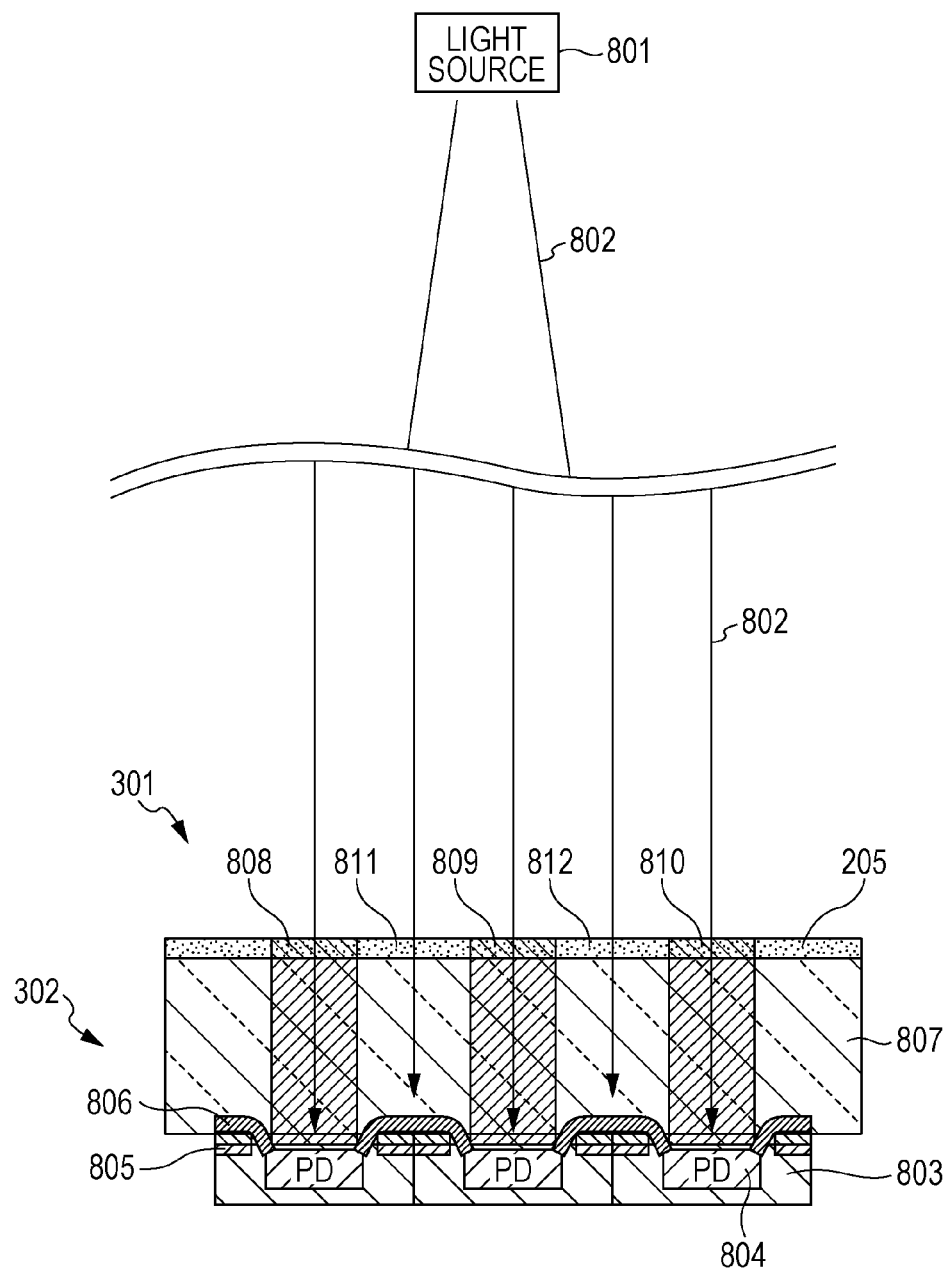
FIG. 8 illustrates an example in which a lighting unit is controlled in such a way as to radiate light onto a stained sample from right above the stained sample.
Figure 9:
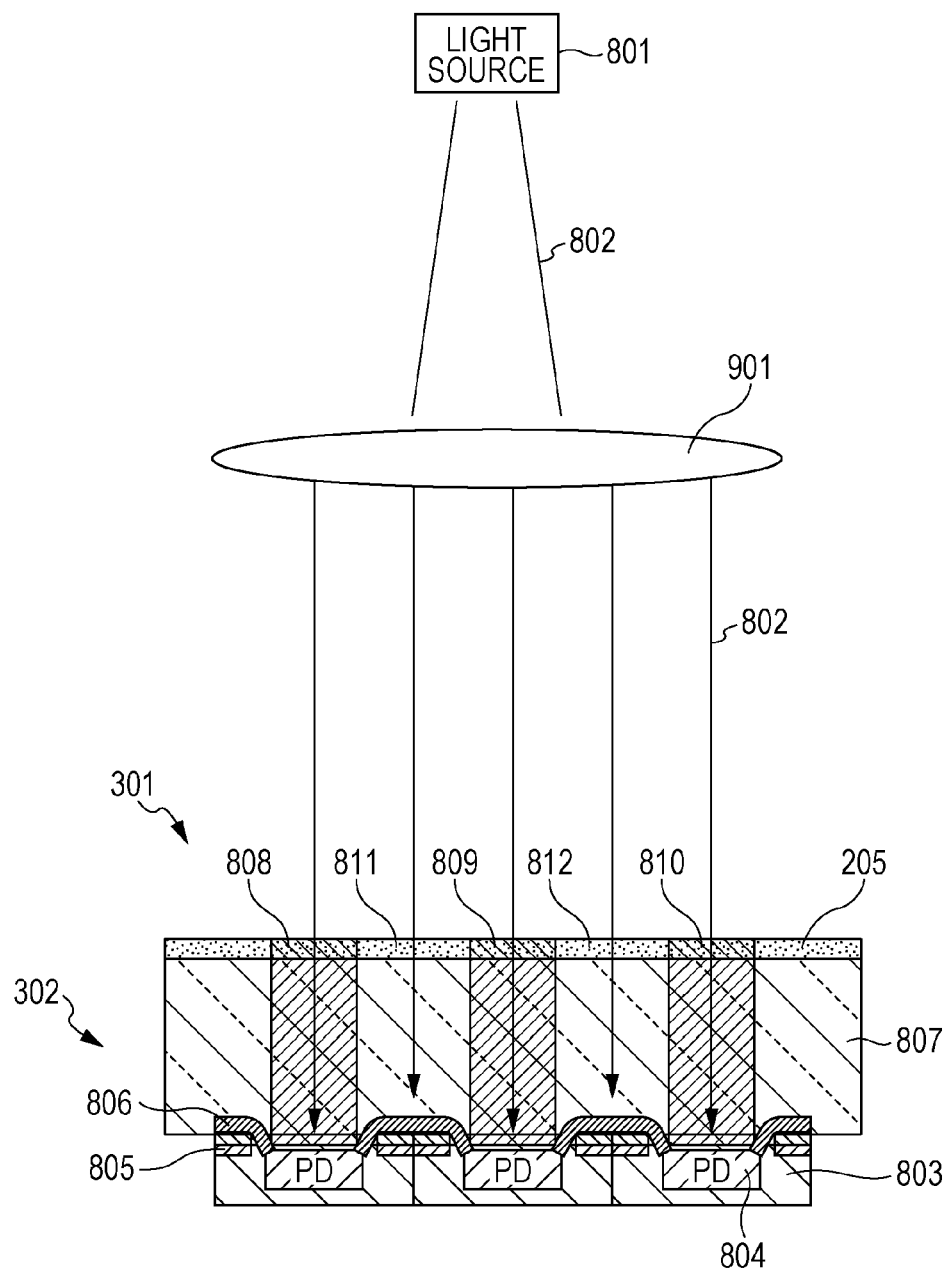
FIG. 9 illustrates an example in which collimated light is radiated from right above the image sensor using a lens.

FIG. 8 illustrates an example in which the lighting unit 109 is controlled in such a way as to radiate light onto a stained sample from right above the stained sample. A light source 801 radiates light 802 onto the stained sample from right above the CIS prepared slide 301. The light source 801 is arranged sufficiently far from the CIS prepared slide 301 in relation to the size of the CIS prepared slide 301. The light 802 can therefore be regarded as collimated light. It is important that the light 802 incident on the sample be collimated light. The collimated light 802 may be obtained by inserting a lens 901 between the CIS prepared slide 301 and the light source 801, instead. FIG. 9 illustrates an example in which the collimated light 802 is radiated from right above the image sensor 302 using a lens. In this configuration, a distance between the CIS prepared slide 301 and the light source 801 can be reduced. The following description given with reference to FIG. 8 also holds for FIG. 9, and accordingly description with reference to FIG. 9 is omitted.

The image sensor 302 includes a semiconductor substrate 803, photodiodes (PDs) 804, a wiring layer 805, a light blocking layer 806 covering the wiring layer 805, and a transparent layer 807 covering a light incident side of the semiconductor substrate 803. Part of the light 802 that has passed through the stained section 205 and has entered the PDs 804 is subjected to photoelectric conversion in the PDs 804 and obtained as image signals. In FIG. 8, light that has passed through regions 808, 809, and 810 corresponds to the part of the light 802 incident on the PDs 804. Densities of the regions 808, 809, and 810 determine output signal levels of the PDs 804 located directly below the regions 808, 809, and 810, respectively.

On the other hand, part of the light 802 incident on the light blocking layer 806 is not subjected to the photoelectric conversion in the PDs 804 and is not converted into image signals output from the image sensor 302. In FIG. 8, light that has passed through regions 811 and 812 corresponds to the part of the light 802 incident on the light blocking layer 806.

Figure 10:
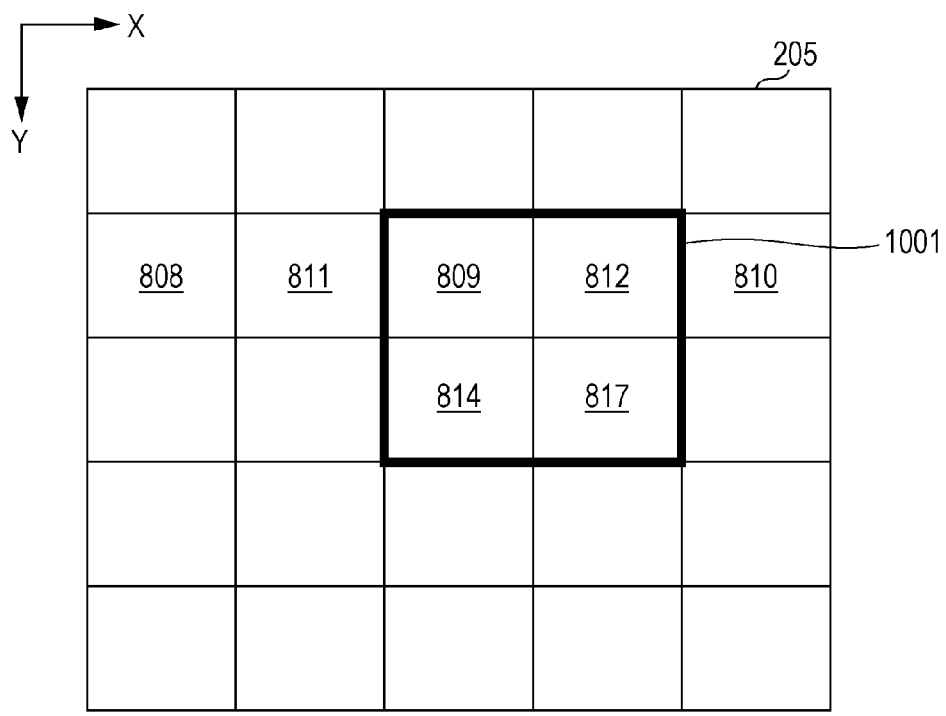
FIG. 10 illustrates regions of the image capture target reflected by an image.

In FIG. 8, the area of the PDs 804 and the area of the light blocking layer 806 are the same. The image sensor 302 is a planar area sensor, and the light incident on the PDs 804 is not all of light that has passed through the sample but light that has passed through separate regions of the sample. FIG. 10 illustrates regions of an image capture target reflected by an image. Since the regions 808, 809, and 810 are located directly above the PDs 804, light that has passed through these regions is incident on the PDs 804. The densities of these regions determine the output signal levels of the PDs 804 and accordingly pixel values of a low-resolution image.

On the other hand, regions 811 and 812 are located directly above the light blocking layer 806, and light that has passed through these regions is not reflected by the pixel values of the low-resolution image. That is, in a region 1001 illustrated in FIG. 10, the light 802 is incident on a PD 804 only through the region 809 and light that has passed through regions 812, 814, and 817 around the region 809 is blocked by the light blocking layer 806. Since the image sensor 302 includes the light blocking layer 806, an image of a region four times smaller than a pixel can be obtained.

Figure 11:
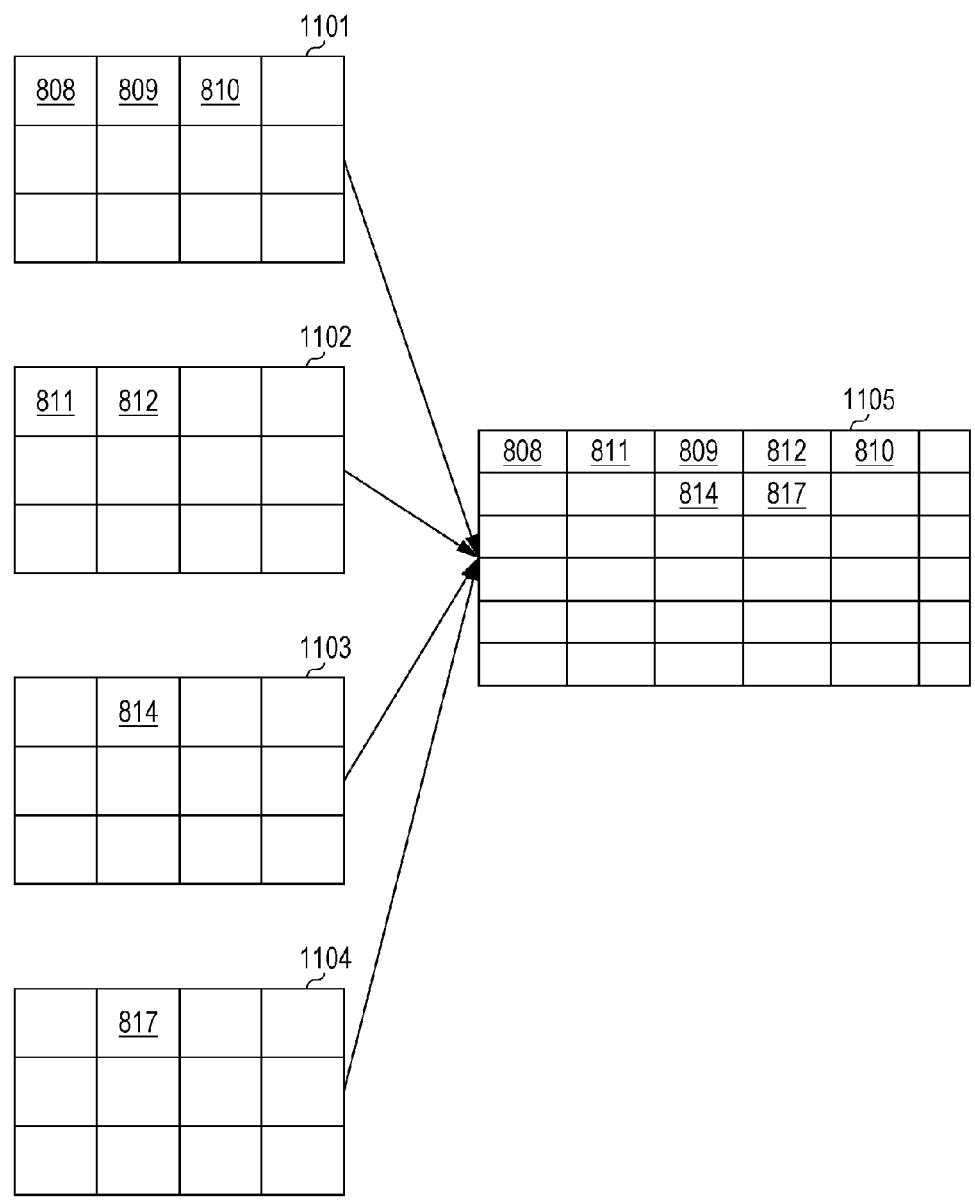
FIG. 11 illustrates a method for creating a magnified image with a magnifying power of 2.

FIG. 11 illustrates a method for creating a magnified image with a magnifying power of 2. As indicated in a left part of FIG. 11, a low-resolution image 1101 captured while turning on the light source 801 is an image generated by receiving light incident on the regions 808, 809, and 810. A magnified image 1105 can be obtained using other low-resolution images 1102 to 1104 as well as the low-resolution image 1101. A method for obtaining the other low-resolution images 1102 to 1104 and the magnified image 1105 will be described later.

Figure 12:
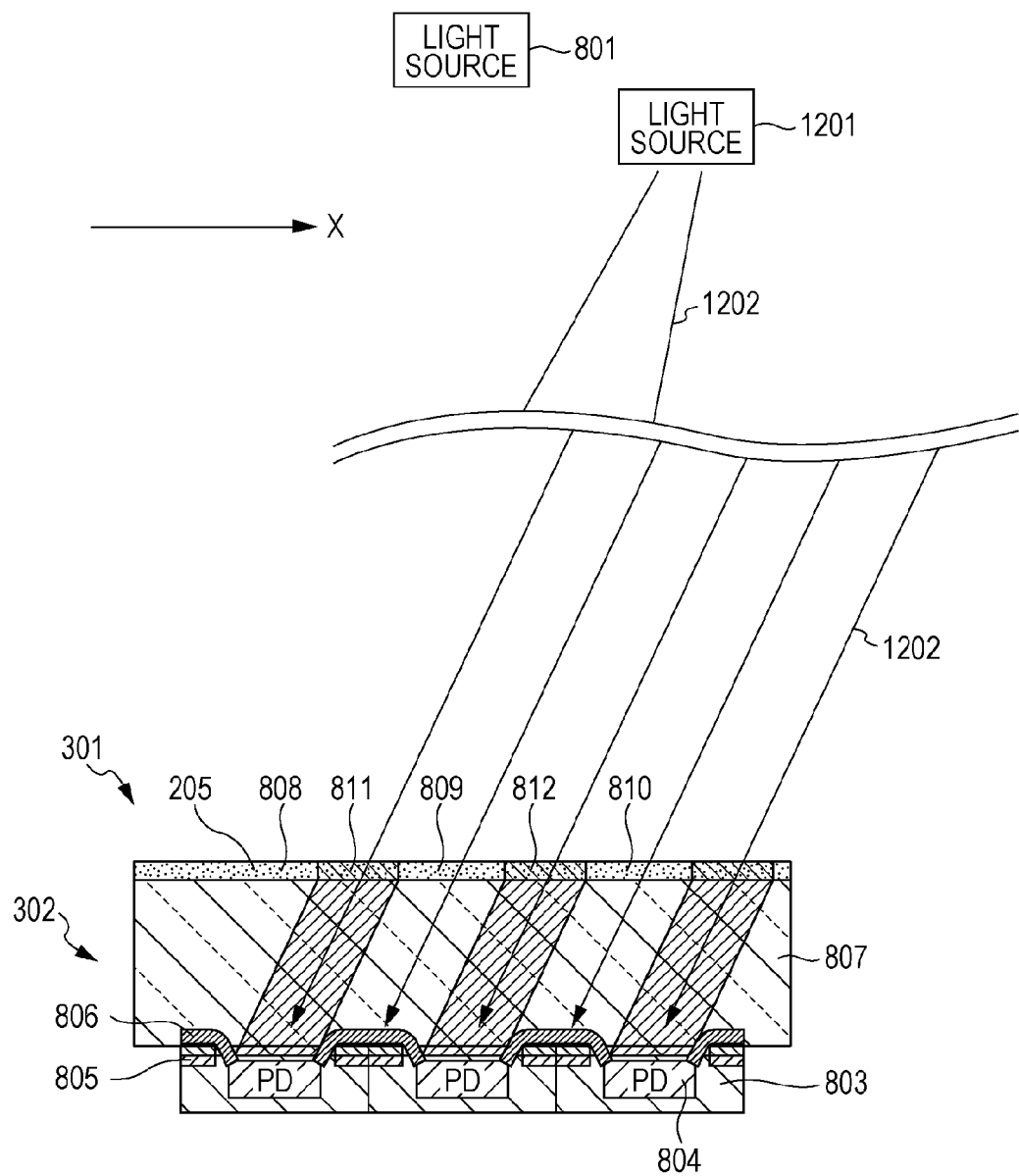
FIG. 12 illustrates an example in which a light source radiates light onto a stained section while moving in an X direction.

Next, a method for capturing a low-resolution image after moving a light source in an X direction will be described with reference to FIG. 12. FIG. 12 illustrates an example in which a light source radiates light onto the stained section 205 after moving in the X direction. FIG. 12 illustrates a case in which the light source radiates light onto the stained section 205 from above right.

A light source 1201 radiates light 1202 onto the CIS prepared slide 301 from above right. The light 1202 radiated from the light source 1201 and incident on the CIS prepared slide 301 is collimated light.

Part of the light 1202 that has passed through the stained section 205 and has entered the PDs 804 is subjected to the photoelectric conversion in the PDs 804 and obtained as image signals. More specifically, light that has passed through the regions 811 and 812 corresponds to the part of the light 1202 incident on the PDs 804. Densities of the regions 811 and 812 determine the output signal levels of the PDs 804 located on the left side below the regions 811 and 812, respectively.

On the other hand, part of the light 1202 incident on the light blocking layer 806 is not subjected to the photoelectric conversion in the PDs 804 and is not converted into image signals output from the image sensor 302. More specifically, in FIG. 12, light that has passed through the regions 808, 809, and 810 corresponds to the part of the light 1202 incident on the light blocking layer 806.

The light incident on the PDs 804 is light that has passed through separate regions of the sample. That is, since PDs 804 are located on the left side below the regions 811 and 812, light that has passed through these regions is incident on these PDs 804. The densities of these regions determine the output signal levels of the PDs 804 and pixel values of a low-resolution image.

On the other hand, light that has passed through the regions 808, 809, and 810 is incident on the light blocking layer 806 and is not reflected by the pixel values of the low-resolution image. That is, in the region 1001 illustrated in FIG. 10, the light 1202 is incident on a PD 804 only through the region 812 and light that has passed through the regions 809, 814, and 817 around the region 812 is blocked by the light blocking layer 806. Since the image sensor 302 includes the light blocking layer 806, an image of a region four times smaller than a pixel can be obtained.

As indicated in the left part of FIG. 11, the low-resolution image 1102 captured after turning on the light source 1201 is an image generated by receiving light incident on the regions 811 and 812.

Figure 13:
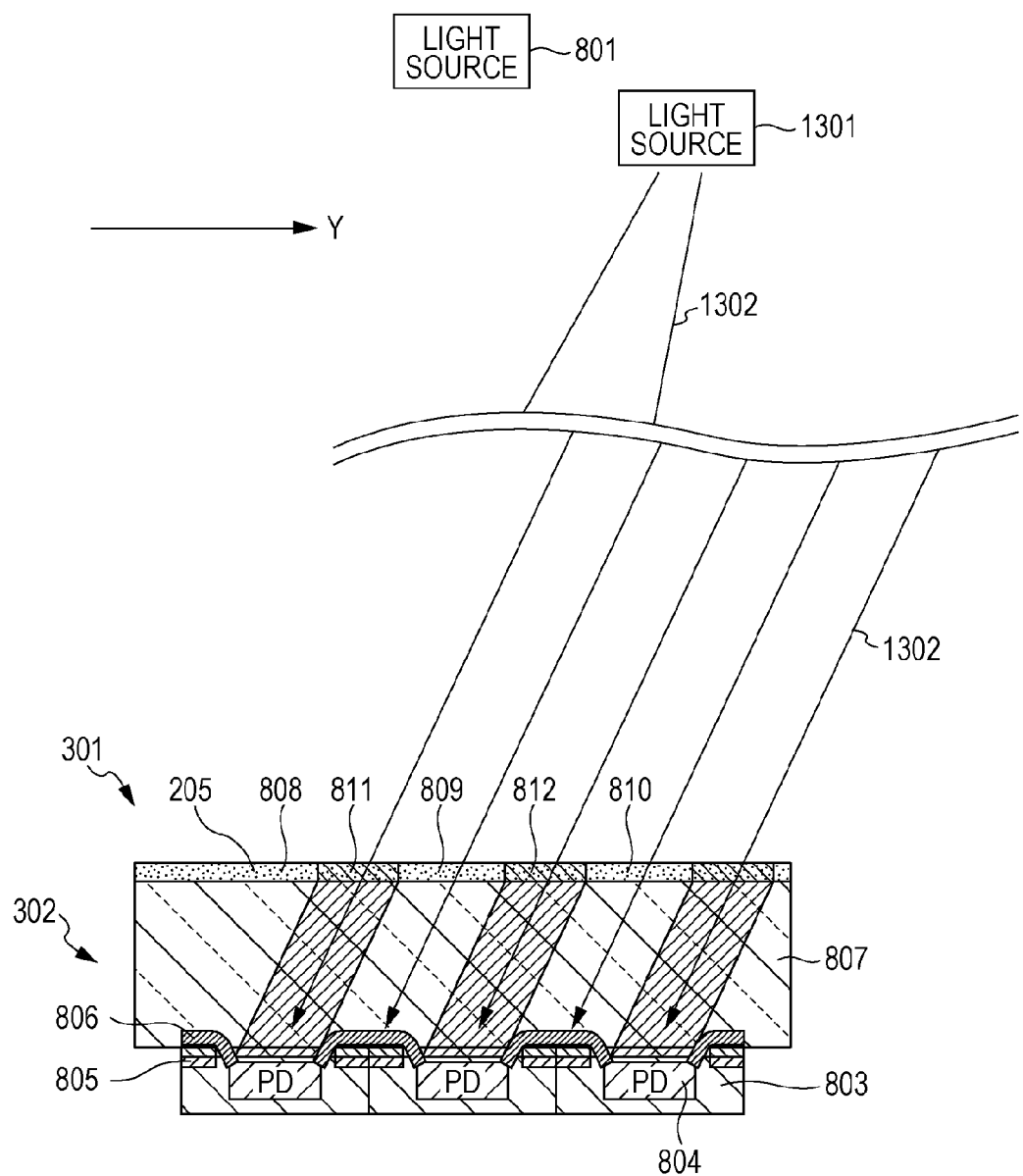
FIG. 13 illustrates an example in which a light source radiates light onto the stained section while moving in a Y direction.
Figure 14:
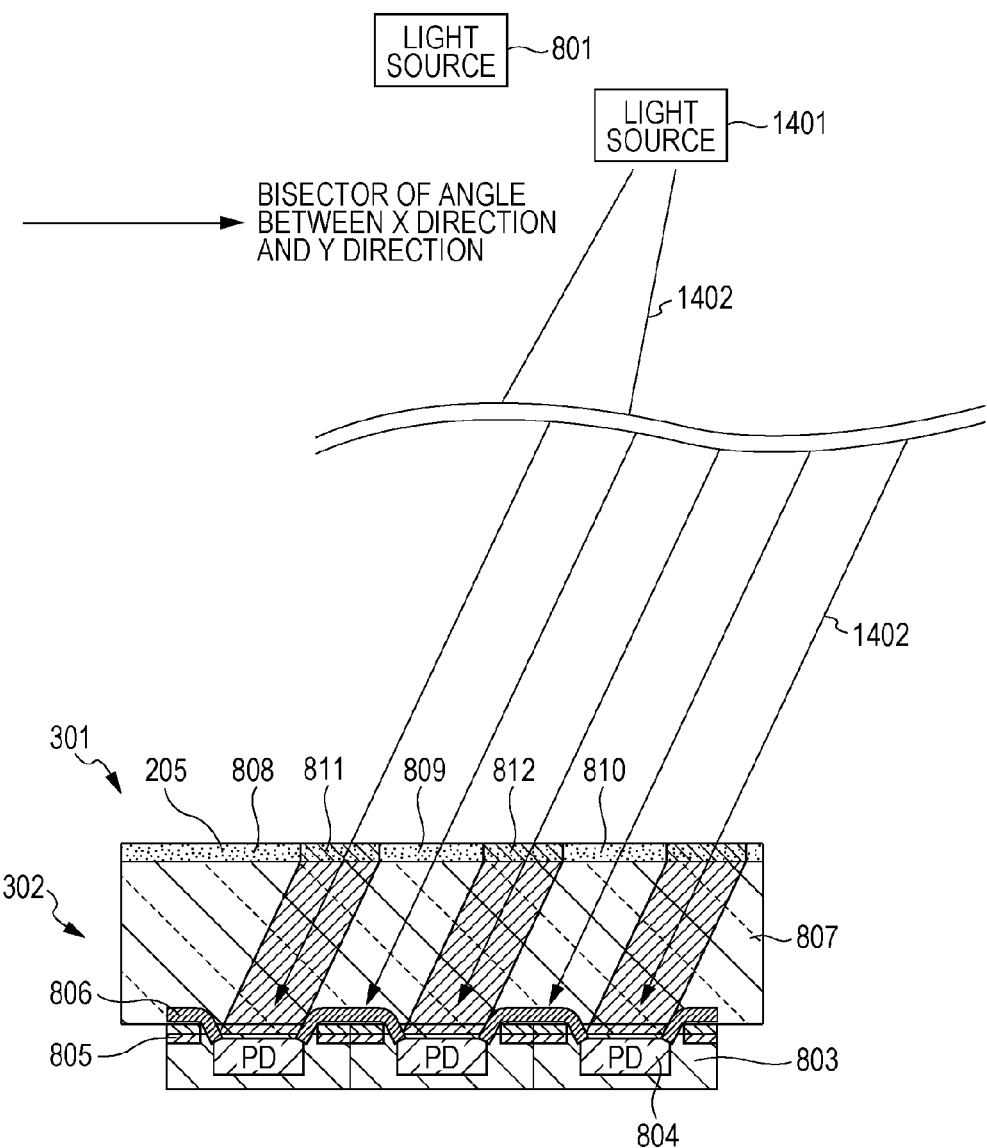
FIG. 14 illustrates an example in which a light source radiates light onto the stained section while moving along a bisector of an angle between the X direction and the Y direction.

FIG. 13 illustrates an example in which a light source radiates light onto the stained section 205 after moving in a Y direction. FIG. 14 illustrates an example in which a light source radiates light onto the stained section 205 after moving along a bisector of an angle between the X direction and the Y direction. By moving the light source in the Y direction as illustrated in FIG. 13 or along the bisector as illustrated in FIG. 14, a region four times smaller than a pixel can be obtained. In the region 1001 (FIG. 10), the light 802 is incident on a PD 804 through the region 814 when the light source moves in the Y direction and through the region 817 when the light source moves along the bisector. A low-resolution image 1103 obtained when a light source 1301 illustrated in FIG. 13 radiates light 1302 onto the CIS prepared slide 301 after moving in the Y direction is therefore an image captured through the region 814. Similarly, a low-resolution image 1104 obtained when a light source 1401 illustrated in FIG. 14 radiates light 1402 onto the CIS prepared slide 301 after moving along the bisector is therefore an image captured through the region 817. The light 1302 used when the light source 1301 moves in the Y direction and the light 1402 used when the light source 1401 moves along the bisector are also collimated light.

By arranging the images captured in the above-described manner in consideration of the movement directions of the light sources, the magnified image 1105 whose size (the number of pixels) is the same as the size of a high-resolution image obtained with a magnifying power of 2 can be obtained as illustrated in FIG. 11.

Figure 15:
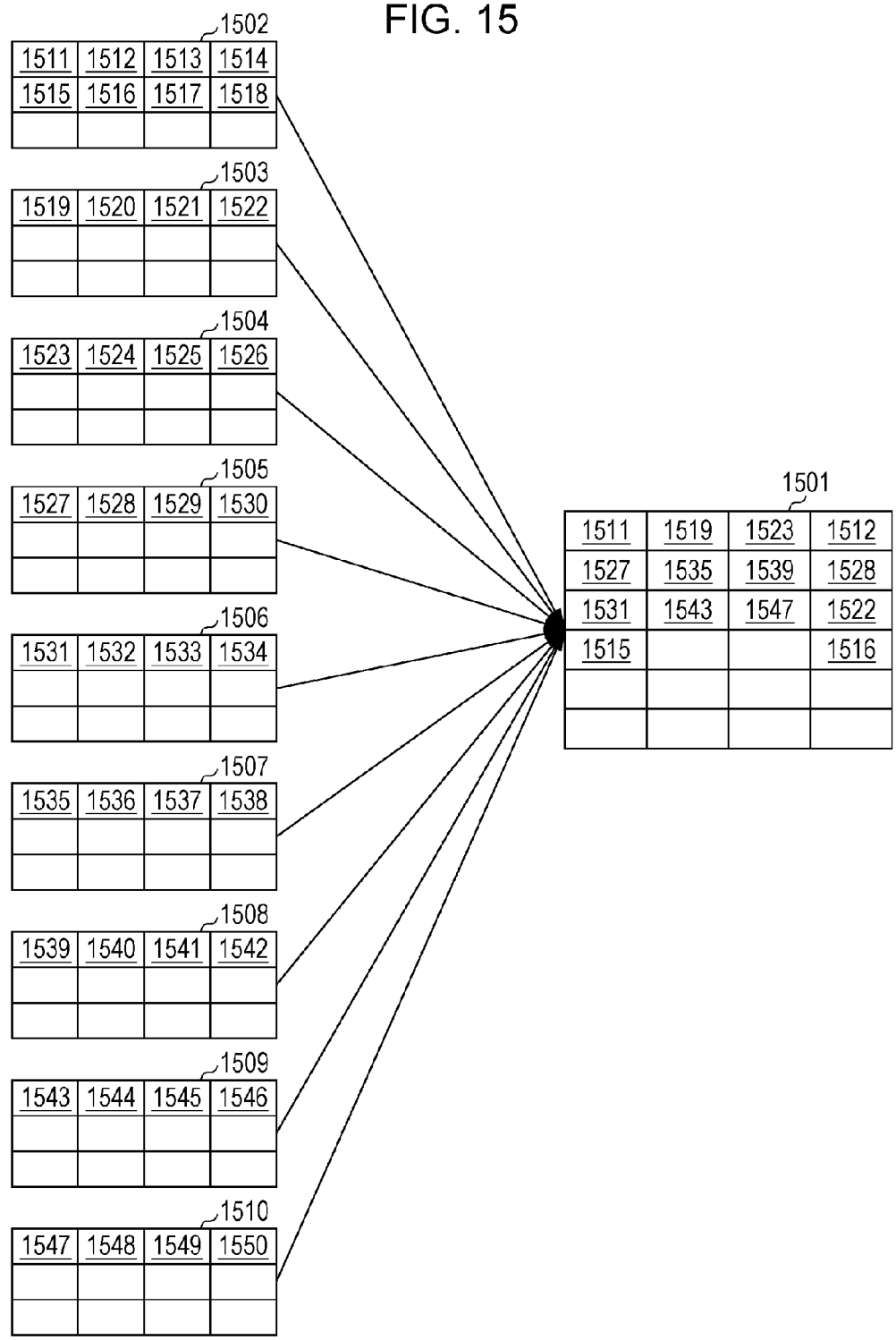
FIG. 15 illustrates a method for obtaining a magnified image by which to obtain a high-resolution image with a magnifying power of 3.

Next, a method for obtaining a high-resolution image will be described with reference to FIG. 15. FIG. 15 illustrates a method for obtaining a magnified image 1501 by which to obtain a high-resolution image with a magnifying power of 3. In order to obtain the magnified image 1501 with a magnifying power of 3, light needs to be radiated from a plurality of positions as in the case of obtaining a magnified image with a magnifying power of 2. More specifically, nine low-resolution images need to be obtained by radiating light from nine positions as illustrated in FIG. 15.

A low-resolution image 1502 illustrated in FIG. 15 is a low-resolution image captured by radiating light onto the sample from right above. Low-resolution images 1503 and 1504 are low-resolution images captured after moving the light source only in the X direction by different distances. Low-resolution images 1505 and 1506 are low-resolution images captured after moving the light source only in the Y direction by different distances. A low-resolution image 1507 is a low-resolution image captured after moving the light source in the X direction by the same distance as for the low-resolution image 1503 and in the Y direction by the same distance as for the low-resolution image 1505. A low-resolution image 1508 is a low-resolution image captured after moving the light source in the X direction by the same distance as for the low-resolution image 1504 and in the Y direction by the same distance as for the low-resolution image 1505. A low-resolution image 1509 is a low-resolution image captured after moving the light source in the X direction by the same distance as for the low-resolution image 1503 and in the Y direction by the same distance as for the low-resolution image 1506. A low-resolution image 1510 is a low-resolution image captured after moving the light source in the X direction by the same distance as for the low-resolution image 1504 and in the Y direction as the same distance as for the low-resolution image 1506.

In order to obtain a magnified image of the same size as that of a high-resolution image obtained with a magnifying power of n, images need to be captured by radiating light onto a pathological sample at least from $n^2$ different positions.

Image Processing Circuit 103

The input interface 105 receives information regarding a pathological sample (information identifying a pathological sample) including information regarding a magnification input by the user and obtains a plurality of images corresponding to the information from the first image section 113.

The dividing unit 106 generates a magnified image on the basis of the plurality of obtained images and performs a process for dividing the generated magnified image into subregions. The dividing unit 106 also extracts a pathological image from the first image section 113. The dividing process may be a process for literally dividing an image and storing resulting subregions in a memory, or may be a process for reading a predetermined amount of image data each time deconvolution, which will be described later, is performed. In a former case, the dividing unit 106 performs a process for dividing image data into a plurality of pieces of image data regarding the subregions of a predetermined size. In a latter case, the dividing unit 106 identifies the predetermined amount of image data to be read and performs a process for requesting reading.

The filter determination unit 107 obtains filter information used for deconvolution from the filter bank section 115 on the basis of information (selection information) regarding the images of the pathological sample received by the input interface 105 and image sensor information. The information regarding the images of the pathological sample may be information identifying the type (for example, a biopsy sample, a cytodiagnosis sample, or an unstained sample) of pathological sample. The image sensor information may be information identifying the aperture ratio of the image sensor.

The arithmetic unit 108 performs deconvolution using the filter information determined by the filter determination unit 107 and outputs a result of the deconvolution.

Deconvolution that uses a magnified image and that takes into consideration differences between portions of an image capture target will be described hereinafter with reference to FIG. 16.

Figure 16:
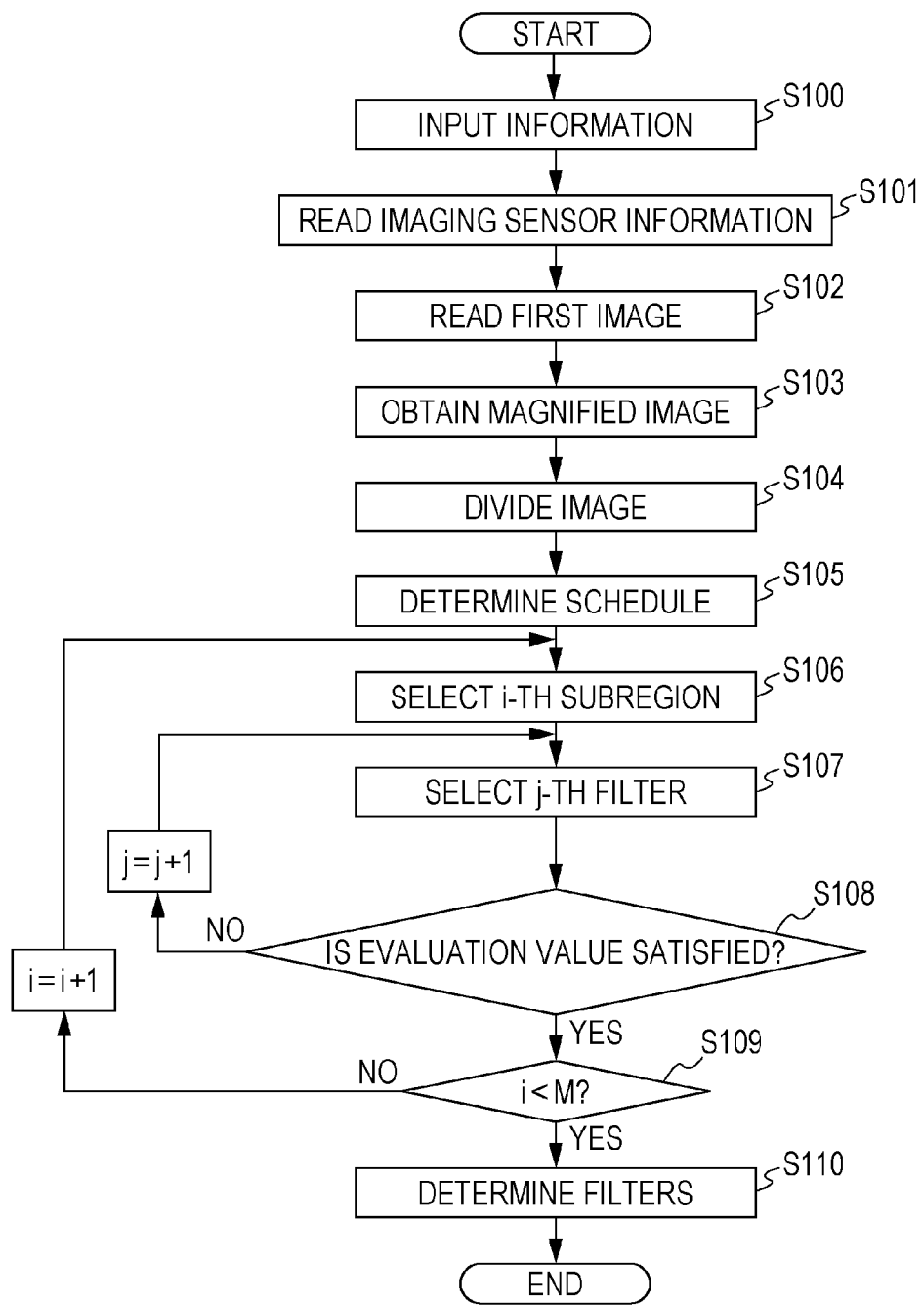
FIG. 16 illustrates a procedure for performing deconvolution that takes into consideration the image capture target and differences between portions of the image capture target.

FIG. 16 illustrates a procedure for performing the deconvolution that takes into consideration an image capture target and differences between portions of the image capture target.

First, in step S100, the user inputs information regarding a pathological sample using an input device (keyboard or the like), which will be described later. The pathological sample may be a biopsy sample, a cytodiagnosis sample, or an unstained sample (cultured cell). The reason why the information regarding the pathological sample is input in advance is that a magnification used differs depending on what type of diagnosis the pathological sample is used for. The magnification used may be determined in advance in accordance with what type of diagnosis the pathological sample is used for, or the user may manually input the magnification used.

Next, in step S101, the image processing circuit 103 reads image sensor information including information regarding an aperture ratio of an image sensor used from the image sensor information section 114 through the input interface 105. In step S102, the image processing circuit 103 reads $n^2$ low-resolution images from the first image section 113 through the input interface 105.

Next, processes performed by the dividing unit 106, the filter determination unit 107, and the arithmetic unit 108 will be described.

Figures 17A, 17B:
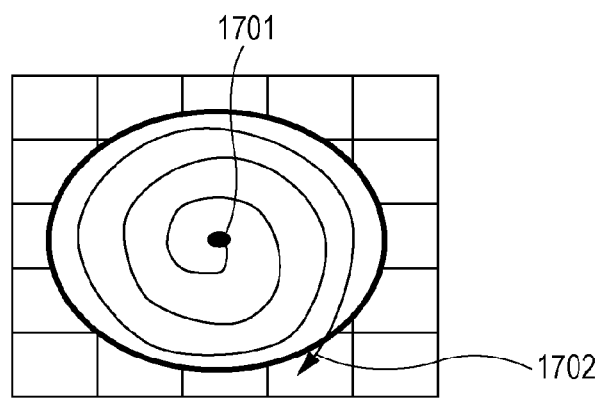
FIG. 17A illustrates an example of subregions, each of which includes w×h pixel values, obtained as a result of division.
FIG. 17B illustrates an example of order in which the subregions are processed.

First, in step S103, the dividing unit 106 obtains a magnified image from the $n^2$ low-resolution images. For example, each low-resolution image includes x2×y2 pixel values (x2 pixels in the horizontal direction and y2 pixels in the vertical direction), and the magnified image includes $n^2 \times x2 \times y2$ pixel values. In step S104, the dividing unit 106 divides the magnified image into subregions and gives numbers to the subregions. How to divide the magnified image into subregions, that is, the size of the subregions, boundaries between the subregions, and the like, may be determined in accordance with whether the pathological sample is a biopsy sample, a cytodiagnosis sample, or an unstained sample. The dividing unit 106 may divide the magnified image into subregions while referring to information regarding the size of subregions and boundaries between the subregions determined in accordance with the pathological sample information (for example, a biopsy sample, a cytodiagnosis sample, or an unstained sample) held by the parameter section 116. FIG. 17A illustrates an example in which the magnified image is divided into subregions 1700a to 1700y, each of which includes w×h pixel values. In this example, n·x2=5w and n·y2=5h. The dividing unit 106 performs this process on the basis of the information regarding the size of the subregions read from the parameter section 116. Each subregion may share a pixel value with an adjacent subregion. In doing do, a correlation is established between processing results obtained from adjacent subregions, and it becomes possible to suppress part of the subregions from outputting significantly different processing results.

Next, in step S105, the dividing unit 106 determines a schedule, that is, order in which the subregions are processed. For example, FIG. 17B illustrates an example of the order in which the subregions are processed. As illustrated in FIG. 17B, a center 1701 of a sample image is extracted, and the subregions are processed in order indicated by an arrow 1702. In subregions that do not include the sample, a subsequent process is not performed. Images of subregions that include the sample and images of the subregions that do not include the sample can be distinguished through threshold processing based on pixel values. A method for extracting a sample image, however, is not limited to that according to the present embodiment, and any method may be used. Information manually selected by the user, for example, may be received as the selection information, or a region extraction method such as threshold processing based on a gradient, graph cuts, region growing, snakes, or a level set method may be used.

Figure 17C:
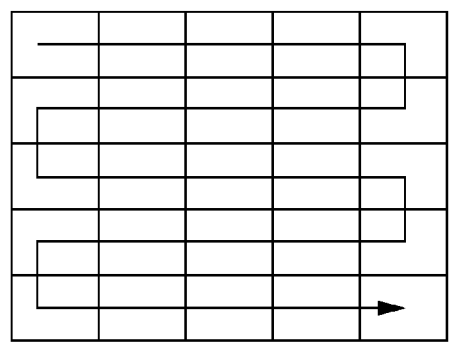
FIG. 17C illustrates an example of the order in which the subregions are processed.
Figure 17D:
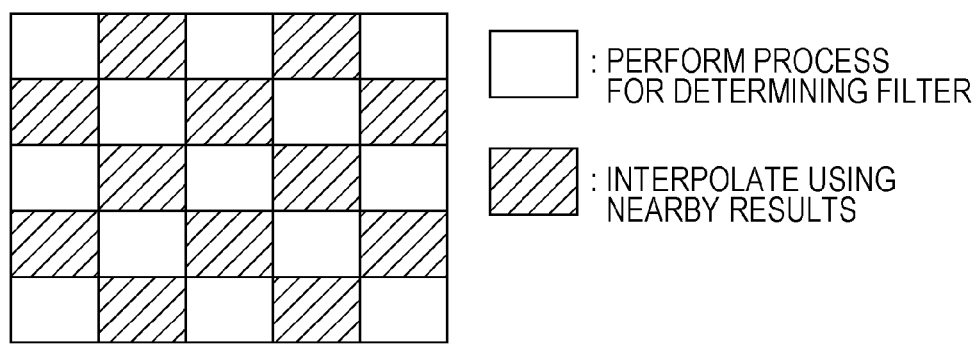
FIG. 17D illustrates an example of the order in which the subregions are processed.

A schedule need not be determined by extracting a sample image in the manner illustrated in FIG. 17B. The subregions may be processed in any order. FIGS. 17C and 17D illustrate examples of a method for extracting a sample image. The dividing unit 106 may extract a sample image by processing a leftmost subregion in a first row first as illustrated in FIG. 17C. Alternatively, the dividing unit 106 may extract a sample image by processing every second subregion as illustrated in FIG. 17D and interpolating unprocessed subregions using nearby results.

The process performed by the dividing unit 106 has been described.

Next, in step S106, the filter determination unit 107 gives numbers to the subregions in accordance with the schedule determined in step S105 and selects an i-th subregion.

In step S107, the filter determination unit 107 selects a j-th filter used in the deconvolution from the filter bank section 115 on the basis of the pathological sample information or the information regarding the magnification and the image sensor. In step S108, the filter determination unit 107 performs calculations and determines whether an evaluation value is satisfied. If the evaluation value is not satisfied (NO), the filter determination unit 107 determines that j=j+1, and the process returns to step S107, in which the j-th filter is selected. If the evaluation value is satisfied (YES), the process proceeds to step S109.

In the present embodiment, the filter determination unit 107 calculates the evaluation value using Math. 6. If the evaluation value falls below a certain value, the filter determination unit 107 determines that the evaluation value is satisfied.

$$E=(U-D*X)^2 \qquad \text{[Math. 6]}$$

A vector U denotes a magnified image, and a vector X denotes a high-resolution image. An asterisk denotes a convolution operation. The evaluation value is not limited to this; for example, the evaluation value may be calculated as a sum of absolute values of edges of a sample region, instead. In this case, a filter with which the sum of the absolute values of the edges of the sample region becomes equal to or larger than the certain value is used. A filter that emphasizes the edges of the sample region can thus be selected.

As the deconvolution, a calculation in a frequency domain that uses a Wiener filter such as Math. 7 is performed.

$$H(X)=H(D)^{-1}H(U) \qquad \text{[Math. 7]}$$

H(•) denotes transformation into the frequency domain. Math. 8 represents $H(D)^{-1}$.

$$H(D)^{-1}=H(D)/(H(D)^2+\Gamma) \qquad \text{[Math. 8]}$$

Γ is a parameter indicating a signal-to-noise (SN) ratio.

Although a calculation in the frequency domain that uses the Wiener filter is used as the deconvolution in the present embodiment, the deconvolution is not limited to this. Any processing method may be used as the deconvolution. In the deconvolution, for example, image data $x_{i,j}$ regarding a high-resolution image can be obtained using an updating expression of Math. 9.

$$x_{i,j}^{t+1} = x_{i,j}^t - \rho \frac{\partial E}{\partial x_{i,j}} \qquad \text{[Math. 9]}$$

$x_{i,j}^t$ denotes image data regarding an (i, j)th high-resolution image in a t-th repeat operation, and p denotes an updating parameter. This expression can be obtained by differentiating Math. 6 with respect to $x_{i,j}$. In consideration of noise in the image, an updating expression obtained by differentiating an expression obtained by adding an L2 norm or an L1 norm to Math. 6 may be used, instead.

The filter bank section 115 is used for storing a plurality of types of filters of different sizes and/or values for different pieces of pathological sample information or information regarding a magnification and an image sensor. A smallest number is given to a typical filter, and the other filters in a filter group are automatically given numbers. FIG. 18 illustrates an example of a number given to a filter. A value 1801 before a first underscore indicates a magnification employed when the filter is used. A value 1802 after the first underscore indicates the aperture ratio of an image sensor. A value 1803 after a second underscore indicates a number given to the filter in the filter group after the magnification and the aperture ratio are determined. In the present embodiment, a typical filter for each magnification and aperture ratio is given a filter number whose value 1803 after the second underscore is 0. The number illustrated in FIG. 18 is thus given to a typical filter for a magnifying power of 3 that uses an image sensor whose aperture ratio is 25%.

Typical filter values for obtaining an image with a magnifying power of 3, for example, will be described hereinafter. First, a filter size is set as the same value as the magnifying power. That is, a 3×3 filter is obtained.

Next, the filter values will be examined. The filter values are set on the basis of information regarding the aperture ratio of the image sensor. It is assumed, as a specific example, that an image is obtained with a magnifying power of 3 and an aperture ratio of 25% as illustrated in FIG. 19. FIG. 19 schematically illustrates how a pixel value $u_{i,j}$ of a pixel at a position (i, j) is generated. The pixel value $u_{i,j}$ of the pixel at the position (i, j) is one of the pixel values, which are included in each subregion illustrated in FIG. 17A, obtained when the light source is set right above an image sensor. Although a case in which the light source is set right above an image sensor will be described for the sake of convenience, the following description is not limited by the position of the light source. FIG. 19 illustrates a light blocking layer 1901 and a PD 1902. Since an image is obtained with a magnifying power of 3, a region illustrated in FIG. 19 is equally divided into nine subregions. If an image is obtained with the light source set right above the image sensor, the resulting pixel value $u_{i,j}$ is a weighted sum of pieces of image data regarding subregions 1900a to 1900i of the high-resolution image. The pixel value $u_{i,j}$ can be represented as follows.

$$u_{i,j} = \sum_k w_k x_{i,j}^k \quad \text{[Math. 10]}$$

$w_k$ denotes a weighting indicating how much the pixel value $u_{i,j}$ reflects the image data regarding a high-resolution image in a sample subregion 1900k (k=a, b, c, d, e, f, g, h, or i). $x_{i,j}^k$ denotes the image data regarding the high-resolution image in the sample subregion 1900k. When an image is obtained with a magnifying power of 3, inverse transformation of the weighted sum in Math. 10 is performed to obtain the image data $x_{i,j}^k$ regarding the high-resolution image. In order to set the filter values, therefore, the weighting $w_k$ is set. As described above, the weighting $w_k$ indicates how much the pixel value $u_{i,j}$ of the pixel at the position (i, j) reflects the information regarding the sample subregion 1900k. An example of a typical filter can therefore be set as in Math. 11 on the basis of a relationship between the aperture ratio and the magnifying power.

$$w = \begin{pmatrix} w_a & w_b & w_c \\ w_d & w_e & w_f \\ w_g & w_h & w_i \end{pmatrix} = \begin{pmatrix} \frac{1}{4} & \frac{1}{2} & \frac{1}{4} \\ \frac{1}{2} & 1 & \frac{1}{2} \\ \frac{1}{4} & \frac{1}{2} & \frac{1}{4} \end{pmatrix} \quad \text{[Math. 11]}$$

FIG. 20 illustrates a method for setting typical filter values at a time when an image is obtained with a magnifying power of 3. $w_a$ in Math. 11 denotes an area ratio of a subregion 2000a at a time when the area of a subregion 2000e illustrated in FIG. 20 is 1. $w_b$ denotes an area ratio of a subregion 2000b. $w_c$ denotes an area ratio of a subregion 2000c. $w_d$ denotes an area ratio of a subregion 2000d. $w_e$ denotes an area ratio of a subregion 2000e. $w_f$ denotes an area ratio of a subregion 2000f. $w_g$ denotes an area ratio of a subregion 2000g. $w_h$ denotes an area ratio of a subregion 2000h. $w_i$ denotes an area ratio of a subregion 2000i.

The method for designing a typical filter has been described.

Next, a filter that takes into consideration differences will be described with reference to the typical filter. The "differences" in the following description refer, for example, to differences in the thickness and moisture content of a pathological sample, the amount and type of mounting medium, and the area ratio represented by Math. 11 between subregions. The differences in the thickness and moisture content of a pathological sample and the amount and type of mounting medium affect the blurriness of a resulting image. In the present embodiment, a Gaussian filter represented by Math. 12 is used as a function indicating blurriness.

$$D_g(i, j) = \frac{1}{2\pi\sigma^2} \exp\left(-\frac{i^2 + j^2}{2\sigma^2}\right) \quad \text{[Math. 12]}$$

$\sigma^2$ is a parameter indicating a variance, and D(i, j) is a filter value in an i-th row and a j-th column. The size of the Gaussian filter need not be the same as the magnifying power; the size of the Gaussian filter when an image is obtained with a magnifying power of 3, for example, may be 5×5.

If $\Delta$ denotes differences in the area ratio arranged in a 3×3 matrix using Math. 11 and Math. 12, a filter $D_v$ that takes into consideration differences can be represented as Math. 13. Each value of $\Delta$ is obtained as a random number or white noise, and the size of $\Delta$ is set to be the same as the filter size represented by Math. 11.

$$D_v = D_g * (W + \Delta) \quad \text{[Math. 13]}$$

The filters stored in the filter bank section 115 are therefore filters whose parameter $\sigma^2$, size of a filter $D_g$, and values of $\Delta$ are different from one another depending on the magnification and the aperture ratio. When the thickness of the pathological sample is constant and the moisture content of the pathological sample, the amount and type of mounting medium, and a method for radiating light onto the pathological sample are accurately controlled, the deconvolution may be performed using only the typical filter.

In step S109, it is determined whether the selection of a filter has been completed for all the subregions. If the selection of a filter has been completed (YES), the process proceeds to step S110. If the selection of a filter has not been completed (NO), it is determined that i=i+1, and the process returns to step S106, in which the i-th subregion is selected.

The process performed by the filter determination unit 107 has been described.

If the selection of a filter has been completed for all the subregions, the arithmetic unit 108 generates, in step S110, a high-resolution image using the filters determined for the subregions and outputs image data regarding the high-resolution image.

The process performed by the arithmetic unit 108 has been described. The display device 104 displays the obtained high-resolution image to the user. The display device 104 also displays results of deconvolution using filters other than the filters determined in the above-described process, in order to enable the user to select an image. In doing so, the user can select an appropriate image even if the filters determined in the above-described process are not appropriate.

When the display device 104 displays a high-resolution image to the user, image data regarding the high-resolution image is normalized such that colors observed through the microscope are reproduced. An image observed through the microscope is obtained in advance as a target image, and the image data regarding the high-resolution image is normalized as in the following expression to achieve colors similar to those of the target image.

$$x'_{i,j} = \frac{x_{i,j} - \mu}{\sigma}\overline{\sigma} + \overline{\mu}$$ [Math. 14]

μ and σ denote an average and a variance, respectively, of a sample image in the image data regarding the high-resolution image before the normalization. μ with an overline (hereinafter denoted as "$\overline{\mu}$") and σ with an overline (hereinafter denoted as "$\overline{\sigma}$") denote an average and a variance, respectively, of image data regarding the target image. The average and variance of the image data regarding the target image are saved in the parameter section 116. The display device 104 normalizes the image data regarding the high-resolution image by reading the parameter information from the parameter section 116. In doing so, a high-resolution image of the same colors can be displayed even if the original image is obtained in a different image capture environment such as when the illumination adjustment unit 110 has been adjusted differently. The display device 104 may also perform tone correction (γ correction) or a YC separation process as well as the normalization.

As described above, according to the present embodiment, a high-resolution image that takes into consideration the type of image capture target and differences between portions of the image capture target can be displayed without measuring the PSF.

Since the filter bank section 115 includes filters of different sizes and/or values for different image capture targets, a different filter can be applied to a different image capture target. In the present embodiment, an image capture target falls into a category of a biopsy sample, a cytodiagnosis sample, or an unstained sample, and an appropriate high-resolution image can be displayed in accordance with the type of sample used by the pathologist. A high-resolution image obtained with a magnifying power of 2, for example, may be used for a biopsy sample, and a high-resolution image obtained with a magnifying power of 3 may be used for a cytodiagnosis sample.

Since the display device 104 also displays results of deconvolution using filters other than an optimal filter to the user in order to enable the user to select an image, the user can select an appropriate image even if inappropriate filters have been determined.

Sine the display device 104 has a function of correcting a high-resolution image in such a way as to achieve colors similar to those of a target image, a high-resolution image of colors similar to those of the target image can be displayed even if an original image has been obtained in a different image capture environment.

Although the display device 104 normalizes (corrects) image data regarding a high-resolution image in the above description, this is just an example. The image processing circuit 103 may perform the correction process, instead. The display device 104 need not perform the correction process especially when the display device 104 is an external display and not included in the image processing apparatus 100. In this case, the image processing circuit 103 may perform the correction process and display a high-resolution image on the display device 104.

Second Embodiment

An image processing apparatus according to a second embodiment is different from the image processing apparatus according to the first embodiment in that the image processing apparatus according to the second embodiment includes a mechanism that changes the numbers to be given to the filter group saved in the filter bank section 115 by feeding results obtained by the filter determination unit 107 back to the filter bank section 115.

Figure 21:
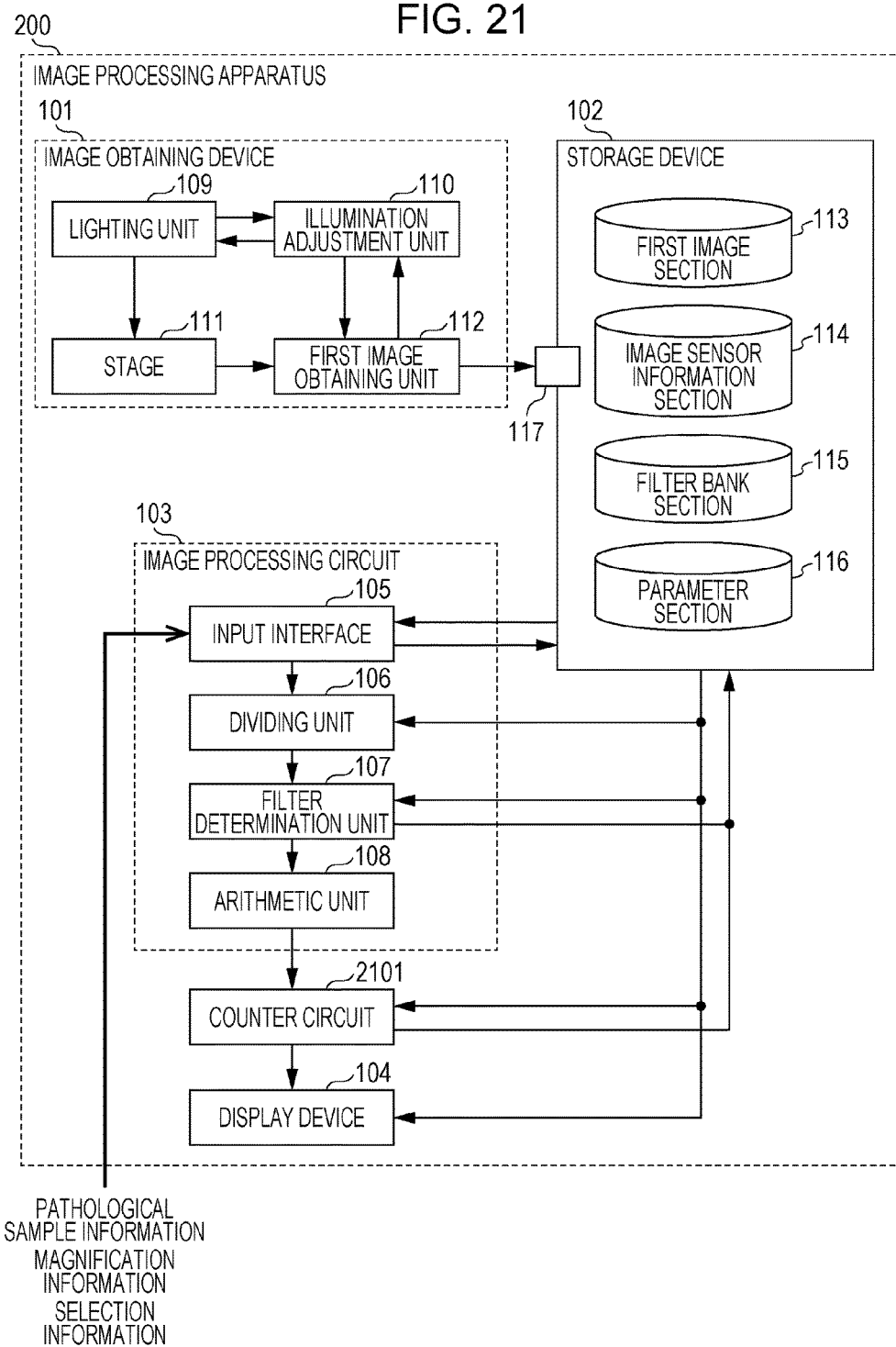
FIG. 21 is a block diagram illustrating an image processing apparatus according to a second embodiment.

FIG. 21 is a block diagram illustrating an image processing apparatus 200 according to the present embodiment. The present embodiment will be described hereinafter with reference to FIG. 21. In FIG. 21, the same components as those illustrated in FIG. 1 are given the same reference numerals, and accordingly detailed description thereof is omitted.

In the present embodiment, the number of times that each filter has been used is counted and saved for each filter in the filter bank section 115 along with a filter number. A counter circuit 2101 counts the number of times.

First, the counter circuit 2101 reads the filter information from the filter bank section 115. The counter circuit 2101 then selects filter numbers of filters that have been determined by the filter determination unit 107 as filters to be used and counts the number of times that each filter is to be used in subregions. If a filter is to be used in three subregions, for example, the counter circuit 2101 determines the number of times that the filter is to be used is 3, and if a filter is to be used in ten subregions, the counter circuit 2101 determines that the number of times that the filter is to be used is 10. The counter circuit 2101 then changes the filter numbers using obtained results and feeds results of the changes back to the filter bank section 115. More specifically, the counter circuit 2101 rearranges the filters in order of the number of times that each filter has been used and renumbers the filter numbers in accordance with the rearrangement. The counter circuit 2101 updates the filter numbers stored in the filter bank section 115 in accordance with these results. A filter that has been used most comes first, and a filter that has been used least comes last. As a result, filters that have been used often are ranked high, and filters that have not been used often are ranked low. In the following description, updating of filter numbers according to the number of times that each filter has been used will also be referred to as "feedback".

Figure 22:
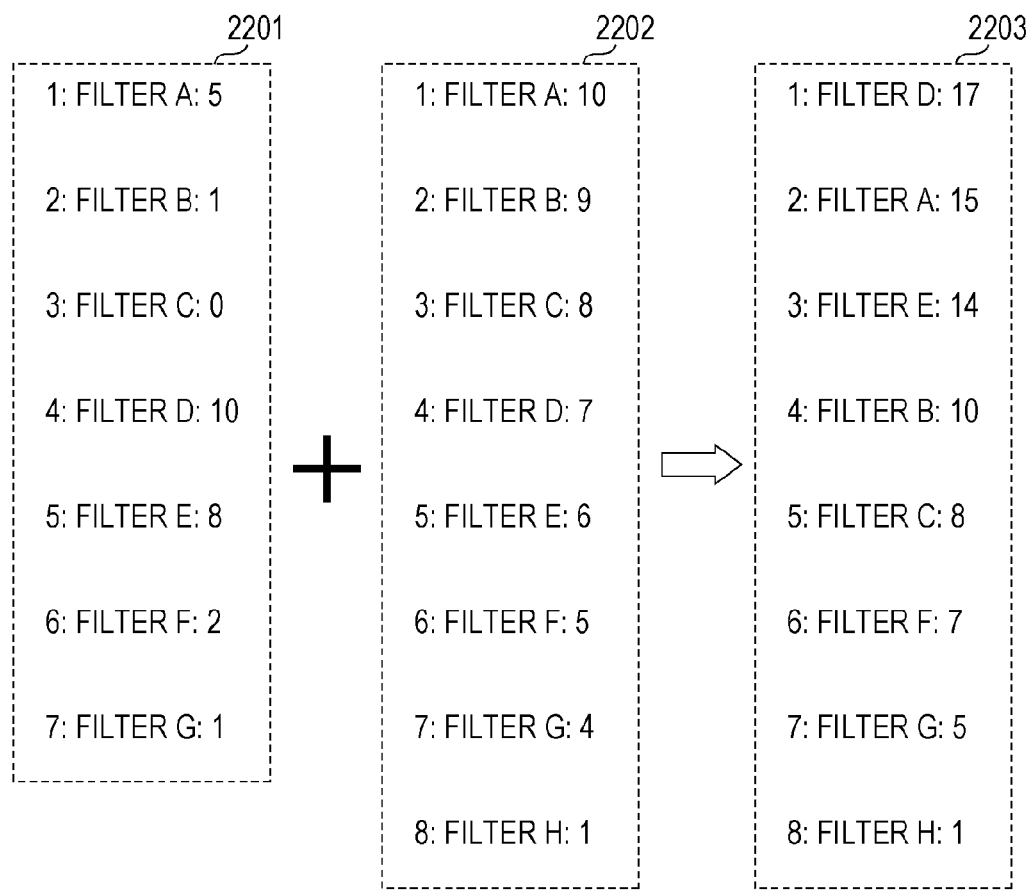
FIG. 22 illustrates an example of changes to numbers given to a filter group saved in a filter bank section.

FIG. 22 illustrates an example of changes to filter numbers given to a filter group saved in the filter bank section 115. A filter group 2201 indicates filter numbers given to the filter group 2201, which is used in subregions of a new image, and the number of times that each filter has been used. A filter group 2202 indicates filter numbers of the filter group 2202, which is saved in the filter bank section 115, and the number of times that each filter has been used. A filter group 2203 indicates filter numbers and the number of times that each filter has been used to be fed back to the filter bank section 115, which have been obtained, after the filters are determined to be used for the new image, by updating the filter numbers of the filter group 2202 on the basis of the number of times that each filter has been used. In FIG. 22, a filter to be used first changes from Filter A to Filter D. The image processing apparatus therefore performs a filter process using these filters in new order.

The counter circuit 2101 also calculates an evaluation value T using Math. 15 for each filter during the feedback. If the evaluation value T falls below a certain value α, a corresponding filter may be removed, and a new filter may be added.

$$T_i = \frac{V_i}{V_1}$$ [Math. 15]

In Math. 15, $V_i$ denotes the number of times that an i-th filter has been used, and $V_1$ denotes a maximum number of times that a filter has been used.

It is assumed in the following description that the certain value α is set to 0.1. FIG. 23 illustrates evaluation values 2301 of the filter group 2203. Among the evaluation values 2301, the evaluation value of Filter H is smaller than the certain value of 0.1. In the present embodiment, the counter circuit 2101 removes Filter H and adds Filter I and updates the filter information stored in the filter bank section 115. The counter circuit 2101 then sets the number of times V that Filter I has been used using Math. 16.

$$V = (int)(\alpha V_1 + \beta)$$ [Math. 16]

δ denotes a random number, and (int)(•) denotes rounding off of the first decimal place. The number of times that Filter I has been used is 9, and a filter group 2302 obtained by rearranging the filters is fed back to the filter bank section 115.

According to the present embodiment, the filter information saved in the filter bank section 115 can be optimized.

Differences between portions of a pathological sample are often caused by differences in skills of a person who prepares the pathological sample and institutions' preference. The image processing apparatus according to the present embodiment can learn such differences, and the filter bank section 115 is customized for each user or institution. According to the present embodiment, a high-resolution image can be displayed in accordance with the user or the institution.

Third Embodiment

An image processing apparatus according to a third embodiment is different from the image processing apparatus according to the first embodiment in that the image processing apparatus according to the third embodiment automatically selects the type of pathological sample. In doing so, high-resolution processing can be performed without the user manually inputting information.

Figure 24:
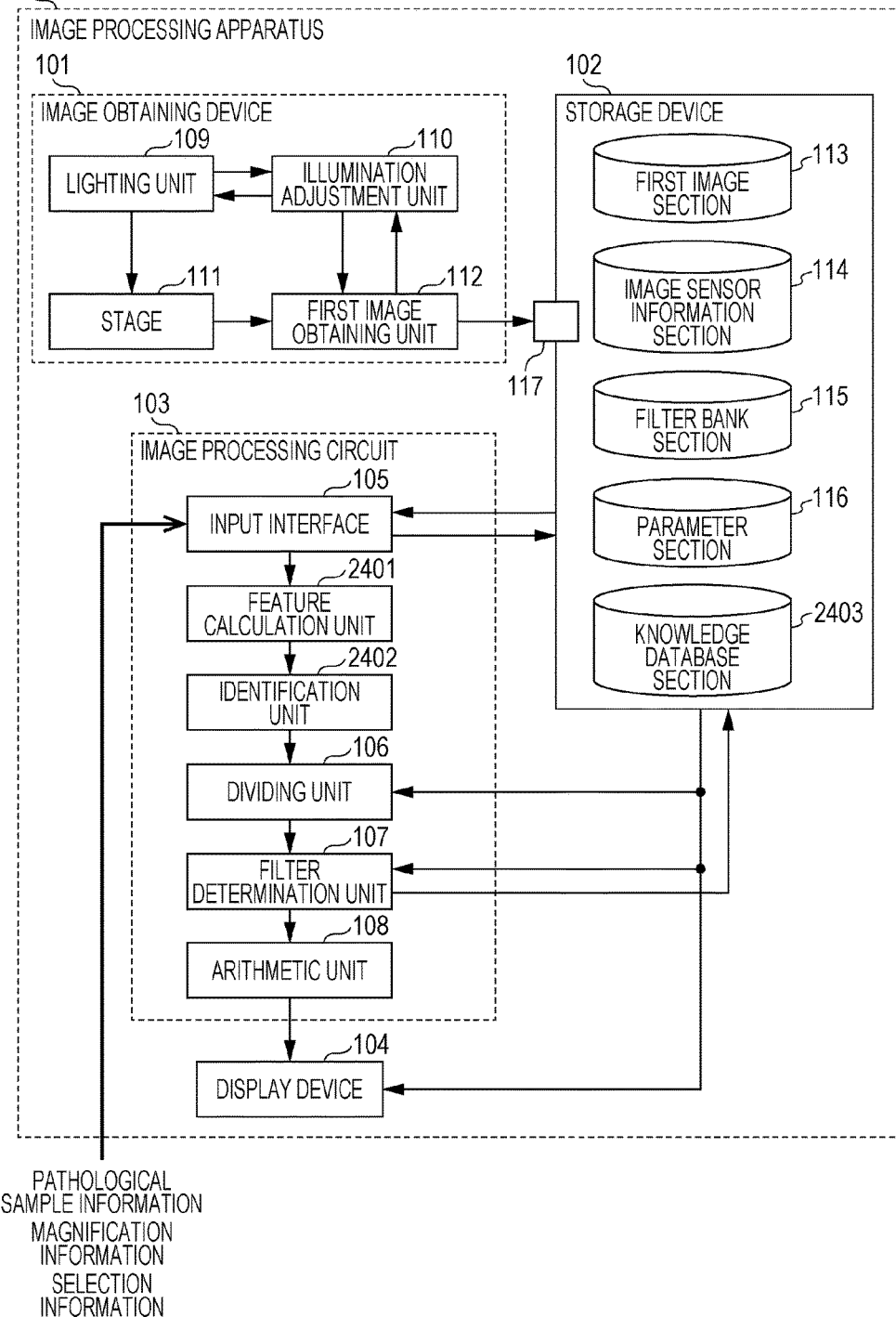
FIG. 24 is a block diagram illustrating an image processing apparatus according to a third embodiment.

FIG. 24 is a block diagram illustrating an image processing apparatus 300 according to the present embodiment. In FIG. 24, the same components as those illustrated in FIG. 1 or 21 are given the same reference numerals, and accordingly detailed description thereof is omitted.

In the present embodiment, first, the image processing circuit 103 reads $n^2$ low-resolution images from the first image section 113 through the input interface 105. A feature calculation unit 2401 calculates an image feature value from a low-resolution image. The reason why a low-resolution image, not a magnified image, is used is that a feature value for determining an image capture target can be calculated without using a magnified image. In addition, processing time taken to calculate a feature value from a low-resolution image is shorter than processing time taken to calculate a feature value from a magnified image.

An RGB color histogram is used as the image feature value because there are various methods for staining a pathological sample depending on diagnostic purposes, that is, whether the pathological sample is used as a biopsy sample or a cytodiagnosis sample, and color information is important in identifying an image capture target. The RGB color histogram, however, is an example of the image feature value, and the image feature value is not limited to the RGB color histogram. Any type of image feature value may be used. Bag-of-features, for example, may be used to incorporate differences in local shapes of a sample into the feature value as well as, or instead of, colors. Alternatively, feature values themselves may be learned from a large amount of image data through deep learning.

Next, an identification unit 2402 determines an image capture target using the feature value calculated by the feature calculation unit 2401. In the present embodiment, a support vector machine (SVM) is used for making the determination. A knowledge database section 2403 is used for storing identification parameters obtained in advance through learning using the SVM. Image feature values of a plurality of types of stained pathological samples are calculated in advance as the identification parameters in accordance with diagnostic purposes (types) such as biopsy samples and cell diagnostic samples. Image feature values of unstained pathological samples are also calculated in advance. The knowledge database section 2403 holds these image feature values as knowledge parameters. The identification unit 2402 reads these identification parameters in order to determine an image capture target and determines, using an SVM, which type of pathological sample an image feature value calculated from a low-resolution image is close to on the basis of the identification parameters. The image processing apparatus 300 can thus determine the type of pathological sample as an image capture target.

As with the image feature value, the determination method is not limited to that according to the present embodiment. Any method may be used. A k-nearest neighbors algorithm or logistic regression, for example, may be used, instead.

According to the present embodiment, an image capture target can be automatically selected. The image processing apparatus can therefore output a high-resolution image without the user inputting an image capture target or a magnification.

Fourth Embodiment

An image processing apparatus according to a fourth embodiment is different from the image processing apparatus according to the first embodiment in that the image processing apparatus according to the fourth embodiment has a function of, using the display device 104, storing filter information corresponding to a result of image information processing and a function of, using the input interface 105, reading filter information corresponding to a high-resolution image and performing deconvolution in subregions selected by the user with a different piece of filter information. A high-resolution image input to the input interface 105 can therefore be corrected.

Figure 25:
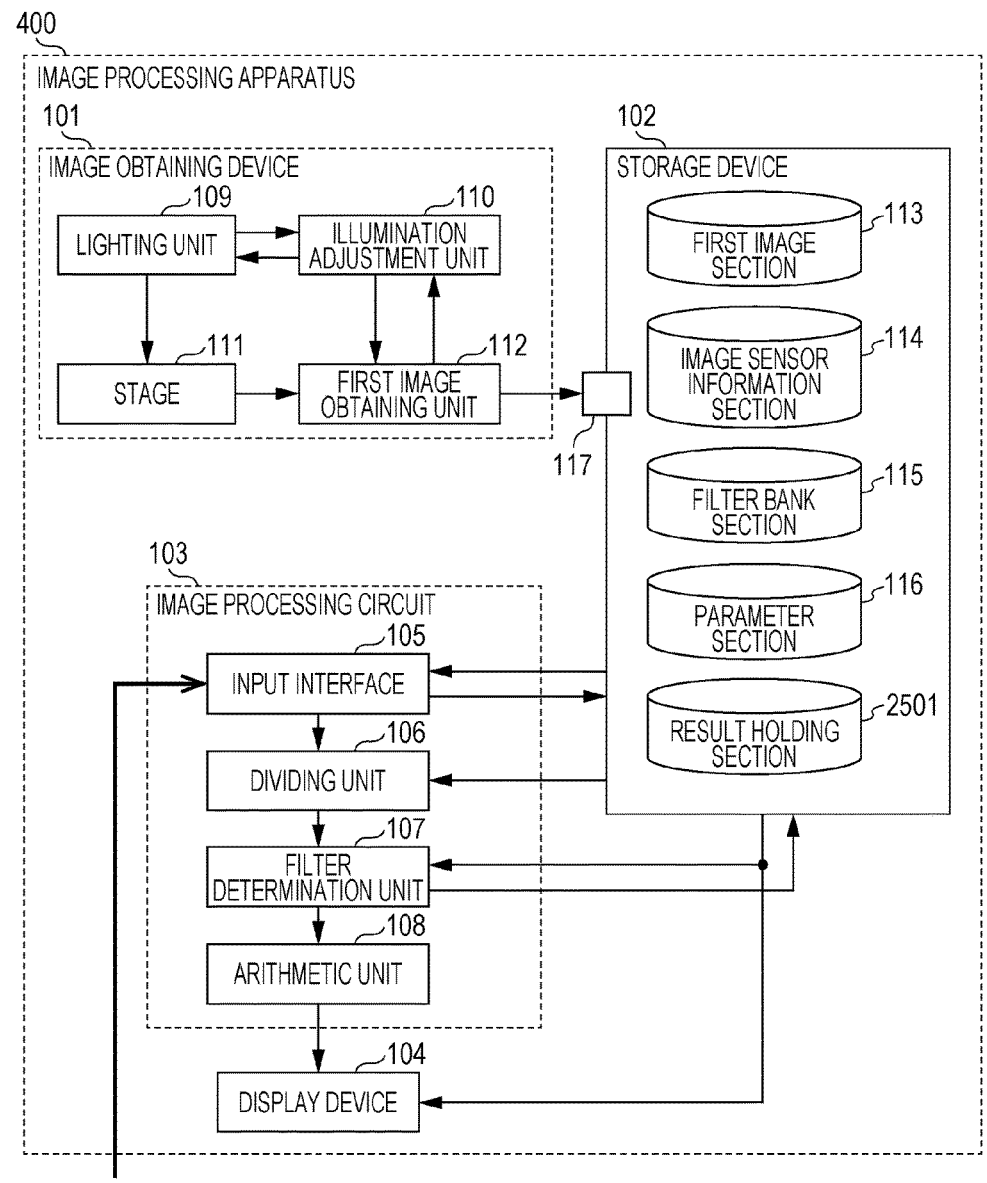
FIG. 25 is a block diagram illustrating another image processing apparatus according to the fourth embodiment.
Figure 26:
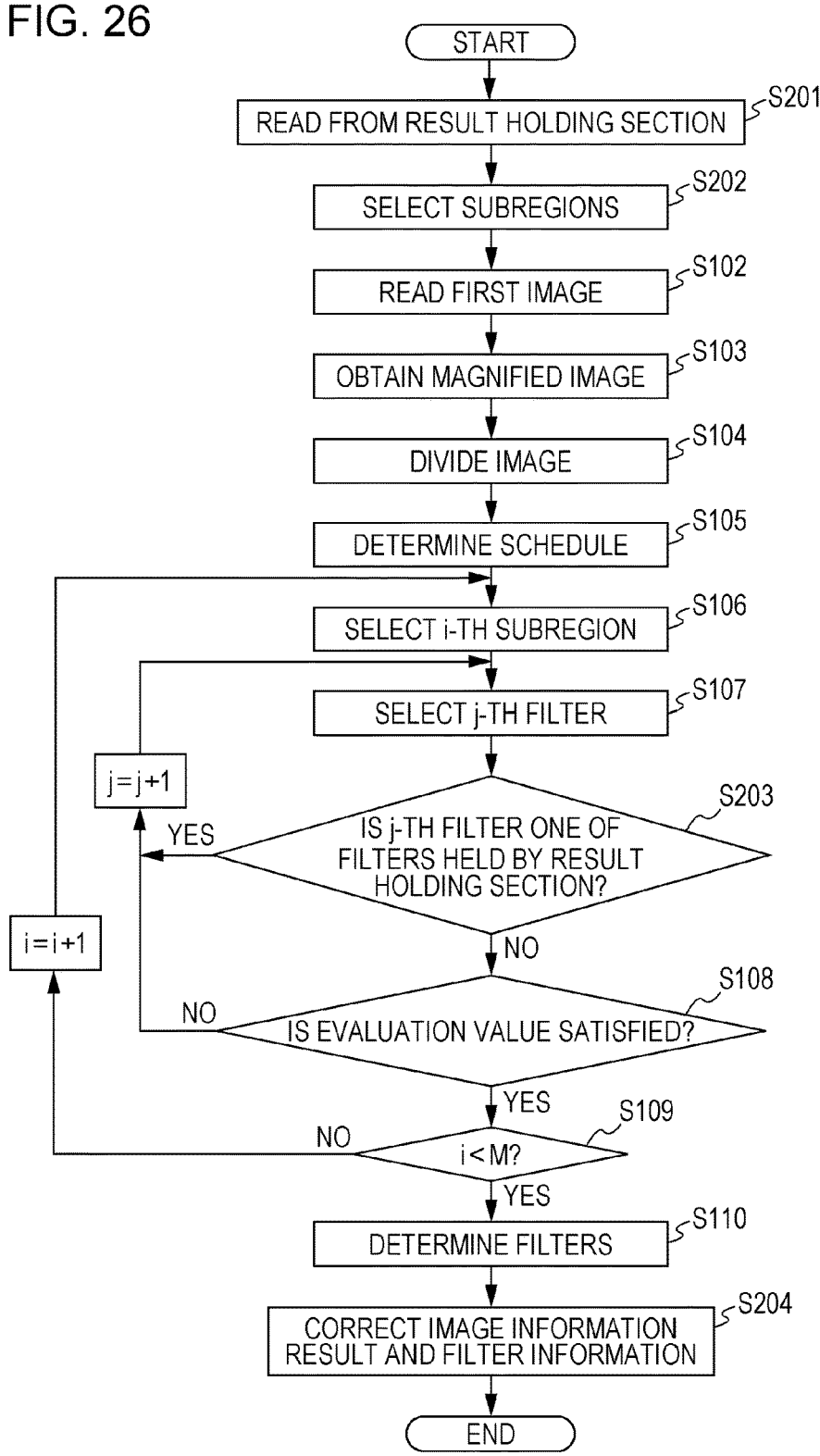
FIG. 26 is a flowchart of the other image processing apparatus according to the fourth embodiment.

FIGS. 25 and 26 are a block diagram and a flowchart, respectively, of an image processing apparatus 400 according to the present embodiment. In the following description, the present embodiment will be described with reference to FIGS. 25 and 26. In FIG. 25, the same components as those illustrated in FIG. 1, 21, or 24 are given the same reference numerals, and detailed description thereof is omitted. Similarly, in FIG. 26, the same steps as those illustrated in FIG. 16 are given the same reference numerals, and detailed description thereof is omitted.

In the present embodiment, a result holding section 2501 is used for storing high-resolution images displayed on the display device 104 and corresponding pieces of filter information. Association between a high-resolution image and a piece of filter information can be realized by, for example, together storing a position at which subregions begin, the size of the subregions, and a selected filter number.

In step S201, the input interface 105 obtains a high-resolution image and a corresponding piece of filter information from the result holding section 2501. In step S202, the input interface 105 obtains information identifying subregions of the high-resolution image selected by the user. A subsequent process is performed only on the selected subregions.

The process performed in the present embodiment by the image processing circuit 103 using the input interface 105 has been described.

Next, in step S203, the filter determination unit 107 determines whether the j-th filter is one of the filters read in advance in order to output a result different from past processing results. If the j-th filter is one of the filters held by the result holding section 2501 (YES), the filter determination unit 107 determines that j=j+1, and the process returns to step S107. If the j-th filter is not one of the filters held by the result holding section 2501 (NO), the process proceeds to step S108.

The process newly performed by the filter determination unit 107 in the present embodiment has been described.

Finally, in step S204, the arithmetic unit 108 corrects the high-resolution image and the filter information. The current processing result is written to the high-resolution image, and a change to the filter information is added.

The process newly performed by the arithmetic unit 108 in the present embodiment has been described.

According to the present embodiment, the user can correct processing results, and images suitable for pathological diagnoses can be provided.

The image processing apparatuses according to the exemplary embodiments of the present disclosure have been described. The configurations described above are examples, and the present disclosure is not limited to these examples.

The image processing apparatuses 100, 200, 300, and 400, for example, may be realized using computers.

Figure 27:
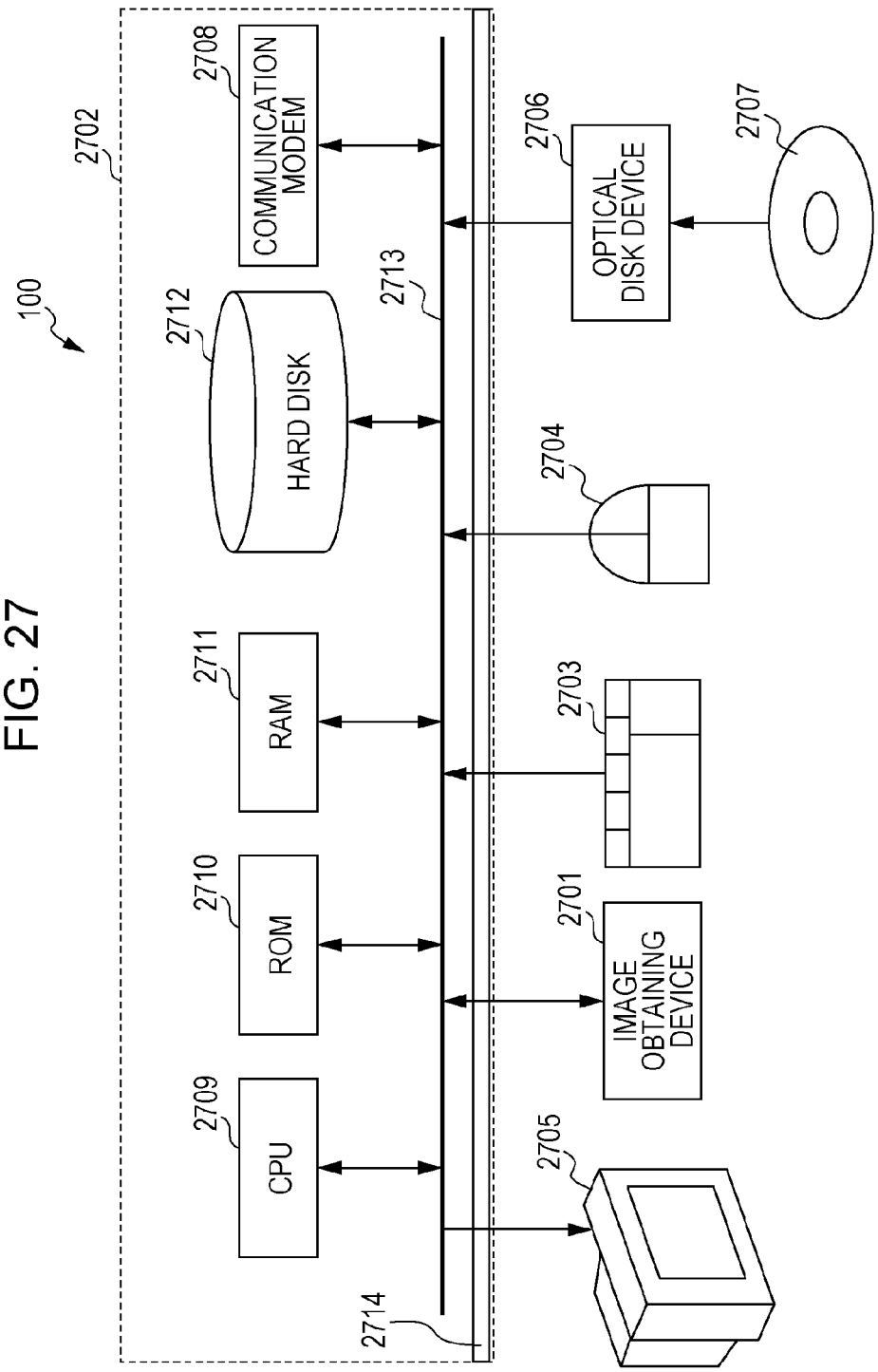
FIG. 27 is a block diagram illustrating the hardware configuration of image processing apparatuses according to first to fourth embodiments.

FIG. 27 is a block diagram illustrating the hardware configuration of the image processing apparatuses according to the first to fourth embodiments. The image processing apparatus 100 according to the first embodiment is taken as an example for convenience of description.

The image processing apparatus 100 includes an image obtaining device 2701, a computer 2702, a keyboard 2703, a mouse 2704, a display 2705, and an optical disk device 2706.

The image obtaining device 2701 obtains images with different radiation angles by radiating light from right above and obliquely above. The keyboard 2703 and the mouse 2704 are input devices for enabling the user to input instructions and transmit the received instructions to the computer 2702. The display 2705 displays information regarding operation results and the like obtained by the computer 2702.

The optical disk device 2706 reads data from an optical disk, which is a computer-readable storage medium typified by a CD-ROM 2707, and transmits the data to the computer 2702. In the CD-ROM 2707, for example, a computer program of the procedure illustrated in the above-described flowchart according to each embodiment may be stored. The optical disk device 2706 reads the computer program from the CD-ROM 2707 and transmits the computer program to the computer 2702. A central processing unit (CPU) 2709 of the computer 2702 loads the computer program into a random-access memory (RAM) 2711 and executes the computer program.

The computer 2702 of the image processing apparatus 100 includes a communication modem 2708 and is capable of receiving the computer program through a computer network.

The computer 2702 includes the CPU 2709, a read-only memory (ROM) 2710, the RAM 2711, a hard disk drive 2712, the communication modem 2708, a bus 2713, and an interface 2714.

The CPU 2709 executes a program read through the optical disk device 2706 or the communication modem 2708. The ROM 2710 is used for storing programs and data necessary to operate the computer 2702. The RAM 2711 is used for storing data such as parameters used for executing programs. The hard disk drive 2712 is used for storing programs and data in a hard disk. The communication modem 2708 communicates with another computer through the computer network. The bus 2713 connects the CPU 2709, the ROM 2710, the RAM 2711, the hard disk drive 2712, the communication modem 2708, the display 2705, the keyboard 2703, the mouse 2704, and the optical disk device 2706 to one another. The interface 2714 a wired and/or wireless communication circuit or connection terminal for communicating information with another device (for example, the image obtaining device 2701).

The keyboard 2703, the mouse 2704, and the optical disk device 2706 connected to the computer 2702 may be removed if, for example, the display 2705 is a touch panel or the communication modem 2708 is used. A semiconductor storage device called a "solid-state drive (SSD)" may be provided instead of, or along with, the hard disk drive 2712.

Part of the components of the image processing apparatus 100 may be configured as a system LSI (large scale integration) circuit, instead. The system LSI circuit is an ultra-multifunctional LSI circuit fabricated by stacking a plurality of elements on a single chip and, more specifically, is a computer system configured by including a microprocessor, a ROM, and/or a RAM. The ROM and/or the RAM are used for storing a computer program. The microprocessor operates in accordance with the computer program, and the system LSI circuit achieves a function thereof. The system LSI circuit may include an SSD.

Part or all of the components of each apparatus described above may be configured as an integrated circuit (IC) card or a module removably attached to each apparatus. The IC card or the module is a computer system configured by including a microprocessor, a ROM, and/or a RAM. The IC card or the module may include the above-mentioned ultra-multifunctional LSI circuit. The microprocessor operates in accordance with a computer program, and the IC card or the module achieves a function thereof. The IC card or the module may be tamper-resistant.

The present disclosure includes the above-described methods. The present disclosure includes a computer program that realizes one of the methods using a computer or a digital signal including the computer program.

The present disclosure also includes a computer-readable non-transitory storage medium, that is, for example, a flexible disk, a hard disk, a CD-ROM, a magneto-optical (MO) disc, a digital versatile disc (DVD), a digital versatile disc read-only memory (DVD-ROM), a digital versatile disc random-access memory (DVD-RAM), a Blu-ray (BD) disc (registered trademark), or a semiconductor memory, storing the computer program or the digital signal. The present disclosure also includes the digital signal stored in the non-transitory storage medium.

In the present disclosure, the computer program or the digital signal may be transmitted through a telecommunication line, a wireless or wired communication circuit, a network typified by the Internet, data broadcasting, or the like.

The present disclosure may be implemented by an independent computer system after transporting the non-transitory storage medium storing the program or the digital signal or transmitting the program or the digital signal through the network.

Figure 28:
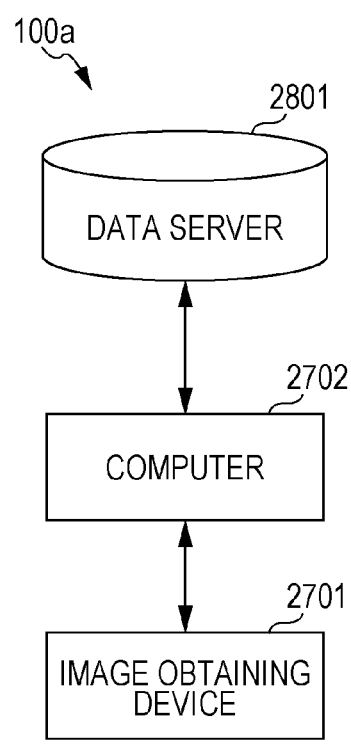
FIG. 28 illustrates an example of a configuration in which the image processing apparatus according to the first embodiment is realized as an image processing system.

FIG. 28 illustrates an example of a configuration in which the image processing apparatus 100 is realized as an image processing system 100a. In FIG. 28, a data server 2801 is constructed instead of the computer 2702 illustrated in FIG. 27. The data server 2801 may hold data to be saved in the storage device 102 (FIG. 1), and the computer 2702 connected to the image obtaining device 2701 may read the information through the network or the like. Alternatively, a plurality of computers 2702 may be connected to the image obtaining device 2701 and read the information from the data server 2801.

The above-described embodiments and modifications may be combined with one another.

The above-described embodiments are all examples and do not limit the scope of the present disclosure. Values, shapes, materials, components, positions at which the components are arranged, modes in which the components are connected to one another, steps, and order of the steps are examples and do not limit the scope of the present disclosure. Among the components described in the embodiments, those not mentioned in the independent claims, which define broadest concepts, have been described as arbitrary components. The scope of the present disclosure is defined not by the above description but by the claims and includes all modifications carried out within meanings and ranges equivalent to the claims.

According to the present disclosure, a high-resolution image that takes into consideration the type of pathological sample and differences between portions of the pathological sample can be obtained. The present disclosure can be applied to an image processing apparatus that obtains a digital image from a pathological test sample.

What is claimed is:

1. An image processing apparatus comprising:
a hardware processor; and
a non-transitory memory storing program which when executed by the hardware processor causes the image processing apparatus to:
generate a plurality pieces of third image information based on a plurality of pieces of first image information and a plurality of pieces of second image information, each of the plurality of pieces of third image information including one of the plurality of pieces of first image information and one of the plurality of pieces of second image information;
determine, based on a type of sample included in information regarding a sample, a filter among filters, to be used for the plurality of pieces of third image information; and
deconvolute each of the plurality of pieces of third image information using the determined filter,
wherein the sample receives first light emitted from a first angle and emits first resulting light,
an image sensor receives the first resulting light and outputs the plurality of pieces of first image information,
the sample receives second light emitted from a second angle and emits second resulting light,
the image sensor receives the second resulting light and outputs the plurality of pieces of second image information,
the first light and the second light are emitted from the same light source or different light sources, there is no focusing optical system along an optical path extending from the same light source to the image sensor or optical paths extending from the different light sources to the image sensor,
the filters include a first filter being an n-by-n matrix and a second filter being an m-by-m matrix,
the m is a natural number and more than 1, and the n is a natural number and more than 1 and different from the m,
when the information regarding the sample is first information, the first filter is determined to be used for the plurality of pieces of third image information, and
when the information regarding the sample is second information different from the first information, the second filter is determined to be used for the plurality of pieces of third image information, and
wherein the type of sample is a biopsy sample, a cytodiagnosis sample, or an unstained sample.

2. The image processing apparatus according to claim 1, wherein a first image includes the plurality of pieces of first image information and a second image includes the plurality of pieces of second image information, and
wherein the type of sample is determined based on an image feature value of the first image.

3. The image processing comprising:
a hardware processor; and
a non-transitory memory storing program which when executed by the hardware processor causes the image processing apparatus to:
generate a plurality pieces of third image information based on a plurality of pieces of first image information and a plurality of pieces of second image information, each of the plurality of pieces of third image information including one of the plurality of pieces of first image information and one of the plurality of pieces of second image information;
determine, based on information regarding a sample, a filter to be used for the plurality of pieces of third image information; and
deconvolute each of the plurality of pieces of third image information using the determined filter,
wherein the sample receives first light emitted from a first angle and emits first resulting light, an image sensor receives the first resulting light and outputs the plurality of pieces of first image information, the sample receives second light emitted from a second angle and emits second resulting light, the image sensor receives the second resulting light and outputs the plurality of pieces of second image information, the first light and the second light are emitted from the same light source or different light sources, there is no focusing optical system along an optical path extending from the same light source to the image sensor or optical paths extending from the different light sources to the image sensor, the information regarding the sample includes a type of sample, the type of sample is a biopsy sample, a cytodiagnosis sample, or an unstained sample, a first image includes the plurality of pieces of first image information and a second image includes the plurality of pieces of second image information, the type of sample is determined based on an image feature value of the first image, an identification parameter indicating a feature value included in an image of a sample is held for each type of sample, and the type of sample is identified using the feature value of the plurality of pieces of first image information and the identification parameters.

4. The image processing apparatus according to claim 1, wherein the processor deconvolutes each of the plurality of pieces of third image information using each of a plurality of types of filters and outputs a result of the deconvolution performed using each of the plurality of types of filters.

5. The image processing apparatus according to claim 4, further comprising:
a display device that displays a result obtained using each of the plurality of types of filters; and
an input device that receives one of the results obtained using the plurality of types of filters.

6. The image processing apparatus according to claim 1, further comprising:
a storage device that holds a target image; and
an image processing circuit that corrects image data regarding a resulting image using image data regarding the target image.

7. A method for processing an image, the method comprising:
generating a plurality pieces of third image information based on a plurality of pieces of first image information and a plurality of pieces of second image information, each of the plurality of pieces of third image information including one of the plurality of pieces of first image information and one of the plurality of pieces of second image information;
determining, based on a type of sample included in information regarding a sample, a filter among filters, to be used for the plurality of pieces of third image information; and
deconvoluting each of the plurality of pieces of third image information using the determined filter,
wherein the sample receives first light emitted from a first angle and emits first resulting light,
an image sensor receives the first resulting light and outputs the plurality of pieces of first image information, the sample receives second light emitted from a second angle and emits second resulting light, the image sensor receives the second resulting light and outputs the plurality of pieces of second image information, the first light and the second light are emitted from the same light source or different light sources, there is no focusing optical system along an optical path extending from the same light source to the image sensor or optical paths extending from the different light sources to the image sensor, the filters include a first filter being an n-by-n matrix and a second filter being an m-by-m matrix, the m is a natural number and more than 1, and the n is a natural number and more than 1 and different from the m, when the information regarding the sample is first information, the first filter is determined to be used for the plurality of pieces of third image information, and when the information regarding the sample is second information different from the first information, the second filter is determined to be used for the plurality of pieces of third image information, and wherein the type of sample is a biopsy sample, a cytodiagnosis sample, or an unstained sample.

8. A non-transitory recording medium storing a program for causing a device including a processor to execute image processing steps, the recording medium being a nonvolatile, computer-readable recording medium, the image processing steps comprising:
generating a plurality pieces of third image information based on a plurality of pieces of first image information and a plurality of pieces of second image information, each of the plurality of pieces of third image information including one of the plurality of pieces of first image information and one of the plurality of pieces of second image information;
determining, based on a type of sample included in information regarding a sample, a filter among filters, to be used for the plurality of pieces of third image information; and
deconvoluting each of the plurality of pieces of third image information using the determined filter,
wherein the sample receives first light emitted from a first angle and emits first resulting light,
an image sensor receives the first resulting light and outputs the plurality of pieces of first image information, the sample receives second light emitted from a second angle and emits second resulting light, the image sensor receives the second resulting light and outputs the plurality of pieces of second image information, the first light and the second light are emitted from the same light source or different light sources, there is no focusing optical system along an optical path extending from the same light source to the image sensor or optical paths extending from the different light sources to the image sensor, the filters include a first filter being an n-by-n matrix and a second filter being an m-by-m matrix, the m is a natural number and more than 1, and the n is a natural number and more than 1 and different from the m, when the information regarding the sample is first information, the first filter is determined to be used for the plurality of pieces of third image information, and when the information regarding the sample is second information different from the first information, the second filter is determined to be used for the plurality of pieces of third image information, and wherein the type of sample is a biopsy sample, a cytodiagnosis sample, or an unstained sample.

* * * * *